US008357749B2

(12) United States Patent
Malotky et al.

(10) Patent No.: US 8,357,749 B2
(45) Date of Patent: Jan. 22, 2013

(54) COATING COMPOSITION AND ARTICLES MADE THEREFROM

(75) Inventors: David L. Malotky, Midland, MI (US); Bernhard Kainz, Lauf (DE); Charles F. Diehl, Blue Bell, PA (US); Denise Lindenmuth, North Wales, PA (US); Timothy J. Young, Bay City, MI (US); John N. Argyropoulos, Midland, MI (US)

(73) Assignees: Dow Global Technologies LLC, Midland, MI (US); Rohm and HAAS Company, Philadelphia, PA (US)

( * ) Notice: Subject to any disclaimer, the term of this patent is extended or adjusted under 35 U.S.C. 154(b) by 135 days.

(21) Appl. No.: 13/039,145

(22) Filed: Mar. 2, 2011

(65) Prior Publication Data

US 2011/0195263 A1 Aug. 11, 2011

Related U.S. Application Data

(63) Continuation-in-part of application No. 12/559,056, filed on Sep. 14, 2009, now Pat. No. 8,063,128, which is a continuation of application No. 10/925,693, filed on Aug. 25, 2004, now Pat. No. 7,803,865.

(60) Provisional application No. 60/548,493, filed on Feb. 27, 2004, provisional application No. 60/497,527, filed on Aug. 25, 2003.

(51) Int. Cl.
*C04B 24/26* (2006.01)
*B60R 13/02* (2006.01)
*C08G 63/48* (2006.01)
*C08F 265/04* (2006.01)
*C08F 210/00* (2006.01)

(52) U.S. Cl. ........ 524/523; 524/536; 524/576; 524/304; 524/348

(58) Field of Classification Search .................. 524/523, 524/536, 576, 304, 348
See application file for complete search history.

(56) References Cited

U.S. PATENT DOCUMENTS

| | | | |
|---|---|---|---|
| 3,166,613 A | 1/1965 | Wright et al. |
| 3,245,934 A | 4/1966 | Krzyszkowski |
| 3,422,049 A | 1/1969 | McClain |
| 3,432,483 A | 3/1969 | Peoples et al. |
| 3,456,044 A | 7/1969 | Pahlke |
| 3,554,994 A | 1/1971 | Maloney et al. |
| 3,590,000 A | 6/1971 | Palermiti et al. |
| 3,645,992 A | 2/1972 | Elston |
| 3,741,253 A | 6/1973 | Brax et al. |
| 3,746,681 A | 7/1973 | McClain |
| 3,908,050 A | 9/1975 | Gor |
| 3,910,840 A | 10/1975 | Adam |
| 4,038,477 A | 7/1977 | Inoue et al. |
| 4,076,698 A | 2/1978 | Anderson et al. |
| 4,340,519 A | 7/1982 | Kotera et al. |
| 4,352,849 A | 10/1982 | Mueller |
| 4,542,199 A | 9/1985 | Kaminsky et al. |
| 4,543,399 A | 9/1985 | Jenkins, III et al. |
| 4,551,380 A | 11/1985 | Schoenberg |
| 4,588,790 A | 5/1986 | Jenkins, III et al. |
| 4,597,920 A | 7/1986 | Golike |
| 4,599,392 A | 7/1986 | McKinney et al. |
| 4,689,351 A | 8/1987 | Endo et al. |
| 4,749,616 A | 6/1988 | Liu et al. |
| 4,752,597 A | 6/1988 | Turner |
| 4,798,081 A | 1/1989 | Hazlitt et al. |
| 4,808,561 A | 2/1989 | Welborn, Jr. |
| 4,818,785 A | 4/1989 | Otawa et al. |
| 4,820,557 A | 4/1989 | Warren |
| 4,837,084 A | 6/1989 | Warren |
| 4,865,902 A | 9/1989 | Golike et al. |
| 4,871,705 A | 10/1989 | Hoel |
| 4,897,455 A | 1/1990 | Welborn, Jr. |
| 4,912,075 A | 3/1990 | Chang |
| 4,927,708 A | 5/1990 | Herran et al. |
| 4,937,217 A | 6/1990 | Chang |
| 4,937,301 A | 6/1990 | Chang |
| 4,952,451 A | 8/1990 | Mueller |

(Continued)

FOREIGN PATENT DOCUMENTS

DE 4428382 A1 2/1996

(Continued)

OTHER PUBLICATIONS

International Search Report (PCT/US2004/027641).
International Search Report (PCT/US2005/006493).
Randall, James C., A Review of High Resolution Liquid $^{13}$Carbon Nuclear Magnetic Resonance Characterizations of Ethylene-Based Polymers, JMS-Rev. Macromol. Chem. Phys., 1989, pp. 201-317, C29 (2&3), Baytown Polymers Center, Baytown Texas.
Scholte, TH. G., et al., Mark-Houwink Equation and GPC Calibration for Linear Short-Chain Branched Polyolefins, Including Polypropylene and Ethylene-Propylene Copolymers, Journal of Applied Polymer Science, 1984, pp. 3763-3782, vol. 29, John Wiley & Sons, Inc.

(Continued)

*Primary Examiner* — William Cheung

(57) ABSTRACT

The instant invention provides an aqueous dispersion, a coating composition, coating layers and coated article made therefrom. The coating composition according to the present invention comprises: (1) the inventive aqueous dispersion comprising the melt blending product of: (a) from 50 to 99 percent by weight of one or more polyethylene terephthalate resins, based on the total solid content of the dispersion; (b) from 1 to 50 percent by weight of one or more stabilizing agents comprising at least one second polyester, based on the total solid content of the dispersion, wherein said second polyester (i) has a carboxylic acid group and an acid number equal to or greater than 15, based on the solid content of the second polyester; or (ii) is a self-dispersing sulfopolyester; (c) one or more neutralizing agents; and (d) from 15 to 90 percent by weight of water, based on the total weight of the dispersion; wherein said dispersion has a solid content of 10 to 85 percent, based on the total weight of the dispersion; and (2) optionally one or more cross-linking agents.

12 Claims, No Drawings

U.S. PATENT DOCUMENTS

| | | | |
|---|---|---|---|
| 4,963,419 A | 10/1990 | Lustig et al. | |
| 4,988,781 A | 1/1991 | McKinney et al. | |
| 4,996,259 A | 2/1991 | Koehler et al. | |
| 5,008,288 A | 4/1991 | Stracher et al. | |
| 5,017,714 A | 5/1991 | Welborn, Jr. | |
| 5,028,670 A | 7/1991 | Chinh et al. | |
| 5,059,481 A | 10/1991 | Lustig et al. | |
| 5,086,025 A | 2/1992 | Chang | |
| 5,120,867 A | 6/1992 | Welborn, Jr. | |
| 5,132,262 A | 7/1992 | Rieger et al. | |
| 5,147,949 A | 9/1992 | Chang | |
| 5,198,401 A | 3/1993 | Turner et al. | |
| 5,228,531 A | 7/1993 | Patterson et al. | |
| 5,238,892 A | 8/1993 | Chang | |
| 5,243,001 A | 9/1993 | Winter et al. | |
| 5,272,236 A | 12/1993 | Lai et al. | |
| 5,278,119 A | 1/1994 | Turner et al. | |
| 5,278,264 A | 1/1994 | Spaleck et al. | |
| 5,278,272 A | 1/1994 | Lai et al. | |
| 5,290,654 A | 3/1994 | Sacripante et al. | |
| 5,296,434 A | 3/1994 | Karl et al. | |
| 5,304,614 A | 4/1994 | Winter et al. | |
| 5,308,734 A | 5/1994 | Sacripante et al. | |
| 5,324,800 A | 6/1994 | Welborn, Jr. et al. | |
| 5,348,832 A | 9/1994 | Sacripante et al. | |
| 5,360,648 A | 11/1994 | Falla et al. | |
| 5,364,486 A | 11/1994 | Falla et al. | |
| 5,370,963 A | 12/1994 | Patel et al. | |
| 5,387,568 A | 2/1995 | Ewen et al. | |
| 5,391,629 A | 2/1995 | Turner et al. | |
| 5,504,172 A | 4/1996 | Imuta et al. | |
| 5,539,021 A | 7/1996 | Pate et al. | |
| 5,545,504 A | 8/1996 | Keoshkerian et al. | |
| 5,574,091 A | 11/1996 | Walther et al. | |
| 5,593,807 A | 1/1997 | Sacripante et al. | |
| 5,648,193 A | 7/1997 | Patel et al. | |
| 5,658,704 A | 8/1997 | Patel et al. | |
| 5,660,965 A | 8/1997 | Mychajlowskij et al. | |
| 5,677,383 A | 10/1997 | Chum et al. | |
| 5,721,025 A | 2/1998 | Falla et al. | |
| 5,756,659 A | 5/1998 | Hughes et al. | |
| 5,798,410 A | 8/1998 | Walther et al. | |
| 5,840,462 A | 11/1998 | Foucher et al. | |
| 5,844,045 A | 12/1998 | Kolthammer et al. | |
| 5,853,944 A | 12/1998 | Foucher et al. | |
| 5,869,575 A | 2/1999 | Kolthammer et al. | |
| 5,874,139 A | 2/1999 | Bosiers et al. | |
| 5,879,768 A | 3/1999 | Falla et al. | |
| 5,938,437 A | 8/1999 | DeVincenzo | |
| 5,942,579 A | 8/1999 | Falla et al. | |
| 5,945,245 A | 8/1999 | Mychajlowskij et al. | |
| 6,106,822 A | 8/2000 | Rademacher et al. | |
| 6,111,023 A | 8/2000 | Chum et al. | |
| 6,117,465 A | 9/2000 | Falla et al. | |
| 6,130,266 A | 10/2000 | Mihayashi et al. | |
| 6,221,191 B1 | 4/2001 | Davis et al. | |
| 6,235,143 B1 | 5/2001 | Crighton et al. | |
| 6,316,549 B1 | 11/2001 | Chum et al. | |
| 6,339,123 B1 | 1/2002 | Raetzsch et al. | |
| 6,359,105 B1 | 3/2002 | Ianni et al. | |
| 6,387,581 B1 | 5/2002 | Moffat et al. | |
| 6,395,445 B1 | 5/2002 | Toth et al. | |
| 6,448,341 B1 | 9/2002 | Kolthammer et al. | |
| 6,448,621 B1 | 9/2002 | Thakur | |
| 6,455,636 B2 | 9/2002 | Sanada et al. | |
| 6,521,679 B1* | 2/2003 | Okada et al. | 523/336 |
| 6,525,157 B2 | 2/2003 | Cozewith et al. | |
| 6,538,070 B1 | 3/2003 | Cardwell et al. | |
| 6,566,446 B1 | 5/2003 | Parikh et al. | |
| 6,767,956 B2 | 7/2004 | Choudhery et al. | |
| 6,777,096 B2 | 8/2004 | Shiba et al. | |
| 6,960,635 B2 | 11/2005 | Stevens et al. | |
| 7,494,757 B2 | 2/2009 | Sacripante et al. | |
| 7,498,112 B2 | 3/2009 | Sweeney | |
| 7,521,166 B2 | 4/2009 | Sata et al. | |
| 7,524,599 B2 | 4/2009 | Vanbesien et al. | |
| 7,528,218 B2 | 5/2009 | Shirai et al. | |
| 7,803,865 B2* | 9/2010 | Moncla et al. | 524/523 |
| 7,947,776 B2* | 5/2011 | Moncla et al. | 524/523 |
| 8,063,128 B2* | 11/2011 | Moncla et al. | 524/284 |
| 8,158,711 B2* | 4/2012 | Moncla et al. | 524/539 |
| 2001/0011118 A1 | 8/2001 | Sanada | |
| 2002/0146509 A1 | 10/2002 | Kodokian et al. | |
| 2003/0157354 A1 | 8/2003 | Van Veghel et al. | |
| 2003/0158341 A1 | 8/2003 | Walton | |
| 2003/0204017 A1 | 10/2003 | Stevens et al. | |
| 2003/0232268 A1 | 12/2003 | Sacripante et al. | |
| 2004/0024094 A1 | 2/2004 | Stemmler | |
| 2004/0027593 A1 | 2/2004 | Wilkins | |
| 2004/0242784 A1 | 12/2004 | Tau et al. | |
| 2005/0100754 A1 | 5/2005 | Moncla et al. | |
| 2005/0271888 A1 | 12/2005 | Moncla et al. | |
| 2005/0271965 A1 | 12/2005 | Kamiyoshi et al. | |
| 2006/0211781 A1 | 9/2006 | Strandburg et al. | |
| 2006/0223934 A1 | 10/2006 | Chen et al. | |
| 2007/0088119 A1 | 4/2007 | Kamiyoshi et al. | |
| 2007/0212628 A1 | 9/2007 | Ishikawa | |
| 2007/0219313 A1 | 9/2007 | Mizuhata et al. | |
| 2007/0292705 A1 | 12/2007 | Moncla et al. | |
| 2008/0006311 A1 | 1/2008 | Brown et al. | |
| 2008/0161487 A1 | 7/2008 | Dorr et al. | |
| 2008/0318145 A1 | 12/2008 | Hu et al. | |
| 2009/0000791 A1 | 1/2009 | Ice | |
| 2009/0011745 A1 | 1/2009 | Cha | |
| 2009/0017393 A1 | 1/2009 | Moffat et al. | |
| 2009/0047591 A1 | 2/2009 | McDougall et al. | |
| 2009/0047593 A1 | 2/2009 | Vanbesien et al. | |
| 2009/0061349 A1 | 3/2009 | Sacripante et al. | |
| 2009/0092918 A1 | 4/2009 | Moffat | |
| 2009/0117482 A1 | 5/2009 | Shirai et al. | |
| 2009/0123862 A1 | 5/2009 | Mang et al. | |
| 2009/0123863 A1 | 5/2009 | Ashizawa et al. | |
| 2009/0123864 A1 | 5/2009 | Sacripante et al. | |
| 2009/0123865 A1 | 5/2009 | Sweeney et al. | |
| 2010/0143837 A1 | 6/2010 | Klier et al. | |

FOREIGN PATENT DOCUMENTS

| | | |
|---|---|---|
| EP | 0277003 A1 | 8/1988 |
| EP | 0277004 A1 | 8/1988 |
| EP | 0359045 A2 | 3/1990 |
| EP | 0426637 A2 | 5/1991 |
| EP | 0427697 A2 | 5/1991 |
| EP | 0495375 A2 | 7/1992 |
| EP | 0520732 A1 | 12/1992 |
| EP | 0525205 A1 | 2/1993 |
| EP | 0558707 A1 | 9/1993 |
| EP | 0573403 A2 | 12/1993 |
| EP | 0696244 A1 | 2/1996 |
| EP | 0718318 A2 | 6/1996 |
| EP | 0760828 A1 | 3/1997 |
| EP | 0972794 A1 | 1/2000 |
| EP | 1035166 A1 | 9/2000 |
| EP | 1123947 A1 | 8/2001 |
| EP | 1193282 A2 | 4/2002 |
| EP | 1245603 A1 | 10/2002 |
| EP | 1312654 A1 | 5/2003 |
| EP | 1394202 A2 | 3/2004 |
| EP | 1482381 A1 | 12/2004 |
| EP | 1482382 A1 | 12/2004 |
| EP | 1489132 A2 | 12/2004 |
| EP | 1736833 A1 | 12/2006 |
| EP | 2012185 A1 | 1/2009 |
| EP | 2015142 A2 | 1/2009 |
| EP | 2026134 A1 | 2/2009 |
| EP | 2028551 A1 | 2/2009 |
| JP | 02-26631 | 1/1990 |
| JP | 05-105791 | 4/1993 |
| JP | 08-20636 | 1/1996 |
| JP | 10-239903 | 9/1998 |
| JP | 11-133668 | 5/1999 |
| JP | 2002-047444 A | 2/2002 |
| JP | 2008-239691 A | 10/2008 |
| WO | WO-9200333 A2 | 1/1992 |
| WO | WO-9523038 A1 | 8/1995 |
| WO | WO-9822646 A1 | 5/1998 |
| WO | WO-0001745 A1 | 1/2000 |
| WO | WO-0164774 A2 | 9/2001 |

| WO | WO-0182708 A1 | 11/2001 |
| WO | WO-0206275 A1 | 1/2002 |
| WO | WO-02062875 A1 | 8/2002 |
| WO | WO-02064856 A1 | 8/2002 |
| WO | WO-02081205 A1 | 10/2002 |
| WO | WO-02083753 A1 | 10/2002 |
| WO | WO-03025058 A1 | 3/2003 |
| WO | WO-03027170 A1 | 4/2003 |
| WO | WO-03040201 A1 | 5/2003 |
| WO | WO-03093355 A1 | 11/2003 |
| WO | WO-2005021622 A2 | 3/2005 |
| WO | WO-2005026275 A1 | 3/2005 |
| WO | WO-2005090427 A2 | 9/2005 |

OTHER PUBLICATIONS

Otocka, E.P., et al., Distribution of Long and Short Branches in Low-Denisty Polyethylenes, Macromolecules, 1971, pp. 507-512, vol. 4, No. 4, Bell Telephone Laboratories, New Jersey.

Jenkins, Wilmer, et al., Multi-Layer Films, Packaging Foods with Plastics, 1991, pp. 19-27.

Butler, Thomas I., Coextrusion, Coextrusion Basics, 1992, pp. 31-80, Chapter 4.

Williams, T., et al., The Construction of a Polyethylene calibration Curve for Gel Permeation Chromatography using Polystyrene Fractions, Journal of Polymer Science Polymer Letters, 1968, pp. 621-624, vol. 6.

Wild, L., et al., Determination of Branching Distributions in Polyethylene and Ethylene Copolymers, Journal of Polymer Science, 1982, pp. 441-455, vol. 20.

Houben-Weyl, Methoden der Organischen Chemie, Band E20, Makromolekulare Soffe, Polyester, 1987, pp. 1405-1429, Georg Thieme Verlag, Stuttgart.

Wicks, Zeno W. et al, Organic Coatings, Science and Technology, 1999, pp. 246-257, second edition, John Wiley & Sons.

PCT/US11/026878, International Search Report.

PCT/US11/026878, Written Opinion of the International Searching Authority.

Olabisi, Olagoke, Handbook of Thermoplastics, 1997, pp. 417-490, Marcel Dekker, Inc.

* cited by examiner

COATING COMPOSITION AND ARTICLES MADE THEREFROM

CROSS-REFERENCE TO RELATED APPLICATIONS

The present application is a continuation-in-part application of the U.S. application Ser. No. 12/559,056, filed on Sep. 14, 2009, now U.S. Pat. No. 8,063,128, entitled "AQUEOUS DISPERSION, ITS PRODUCTION METHOD, AND ITS USE," which is a continuation application of the U.S. patent application Ser. No. 10/925,693, filed on Aug. 25, 2004, and now U.S. Pat. No. 7,803,865 B2, which is entitled "AQUEOUS DISPERSION, ITS PRODUCTION METHOD, AND ITS USE," the teachings of which are incorporated by reference herein, as if reproduced in full hereinbelow, which claims priority to the U.S. Provisional Application Ser. No. 60/497,527, filed on Aug. 25, 2003, entitled "FROTHS AND DURABLE FOAMS OF DISPERSED OLEFIN POLYMERS AND ARTICLES PREPARED FROM SAME," and the U.S. Provisional Application Ser. No. 60/548,493, filed on Feb. 27, 2004, entitled "FROTH AND DURABLE FOAM OF DISPERSED OLEFIN POLYMERS, METHODS OF MAKING FOAM AND ARTICLES PREPARED FROM SAME," the teachings of which are incorporated by reference herein, as if reproduced in full hereinbelow.

FIELD OF INVENTION

The instant invention relates to a coating composition and articles made therefrom.

BACKGROUND OF THE INVENTION

The application of various treatment and pretreatment solutions to metals to retard or inhibit corrosion is well established. This is particularly true in the area of metal food and beverage cans as well as non-food metal containers. Coatings are applied to the interior of such containers to prevent the contents from contacting the metal parts of the container. Contact between the metal and the food or beverage as well as non-food substances can lead to corrosion of the metal container, which can then contaminate the food or beverage or the non-food contents of such metal containers. Corrosion is particularly problematic when food and beverage products are highly acidic nature and/or are having a high salt content such as a rhubarb-based products or isotonic drinks. Also strong alkaline contents of non-food substances such as hair-dye may react with metal, for example aluminum, parts of containers. The coatings applied, for example, to the interior of food and beverage cans also helps prevent corrosion in the head space of the cans, which is the area between the fill line of the food product and the can lid. The coatings may be applied to the outside of metal containers to provide protection against the external environment or to provide a decorative layer including fillers and/or pigments. In addition to corrosion protection, coatings for food and beverage cans should be non-toxic and inert, and, if applied to the internal surface, should not adversely affect the taste or appearance, e.g. color, of the food or beverage in the can or contribute to a contamination of the contents of the can. Resistance to "popping", "blushing" and/or "blistering" is also desired. Certain coatings are particularly applicable for application onto coiled metal stock, such as the coiled metal stock from which the ends of cans are made, "can end stock" and valve cups, e.g. top ends of aerosol cans. Since coatings designed for use on can end stock are applied prior to the ends being cut and stamped out of the coiled metal stock, they are also typically flexible and/or extensible. For example, can end stock is typically coated on both sides. Thereafter, the coated metal stock is punched and may be beaded or bent. It may also be scored for the "pop-top" opening and the pop-top ring is then attached with a pin that is separately fabricated. The end is then attached to the can body by an edge rolling process. Accordingly, the coating applied to the can end stock typically has a certain degree of toughness and flexibility, such that it can withstand extensive fabrication processes, in addition to some or all of the other desirable features discussed above. Various coatings such as epoxy-based and polyvinyl chloride-based, e.g. organosol type, coatings have been used in the past to coat the interior of metal cans to prevent corrosion. However, there is a need for food and beverage can liners as well as non-food container liners that provide improved properties such as having resistance to degradation in corrosive media as well as appropriate level of flexibility.

SUMMARY OF THE INVENTION

The instant invention provides an aqueous dispersion, a coating composition, coating layers and coated article made therefrom.

In one embodiment, the instant invention provides an aqueous dispersion comprising the melt blending product of: (a) from 50 to 99 percent by weight of one or more polyethylene terephthalate resins, based on the total solid content of the dispersion; (b) from 1 to 50 percent by weight of one or more stabilizing agents comprising at least one second polyester, based on the total solid content of the dispersion, wherein said second polyester (i) has a carboxylic acid group and an acid number equal to or greater than 15, for example equal or greater than 20, based on the solid content of the second polyester; or (ii) is a self-dispersing sulfopolyester; (c) one or more neutralizing agents; and (d) from 15 to 90 percent by weight of water, based on the total weight of the dispersion; wherein said dispersion has a solid content of 10 to 85 percent, based on the total weight of the dispersion.

In an alternative embodiment, the instant invention further provides a method for producing a aqueous dispersion comprising the steps of: (1) selecting one or more polyethylene terephthalate resins; (2) selecting one or more stabilizing agents comprising at least one second polyester, based on the total solid content of the dispersion, wherein said second polyester (i) has a carboxylic acid group and an acid number equal to or greater than 15, for example equal or greater than 20, based on the solid content of the second polyester; or (ii) is a self-dispersing sulfopolyester; (3) selecting one or more neutralizing agents; (4) melt-blending said one or more polyethylene terephthalate resins, one or more stabilizing agents in the presence of water and one or more neutralizing agents; (4) thereby producing an aqueous dispersion having a solid content of 10 to 85 percent, based on the total weight of the dispersion.

In another alternative embodiment, the instant invention further provides a coating composition comprising: (a) the inventive aqueous dispersion, as described hereinabove; (b) optionally one or more cross-linking agents; (c) optionally one or more selected from the group consisting of a polyolefin dispersion, acrylic latex, epoxy resin dispersion, polyurethane dispersion, alkyd dispersion, vinyl acetate dispersion, and ethylene vinyl acetate dispersion.

In another alternative embodiment, the instant invention further provides a coating layer comprising at least one or more film layers derived from the inventive coating composition, as described hereinabove.

In another alternative embodiment, the instant invention further provides a coated article comprising: (1) one or more substrates; (2) at least one or more coating layers derived from the inventive coating composition, as described hereinabove.

In another alternative embodiment, the instant invention further provides a method for making a coated article comprising the steps of: (1) selecting a substrate; (2) selecting the inventive coating composition, as described hereinabove; (3) applying said coating composition to at least one surface of said substrate; (4) removing at least a portion of the water from said the coating composition; (5) thereby forming one or more coating layers associated with said substrate; and (6) thereby forming said coated substrate into a coated article.

In another alternative embodiment, the instant invention further provides a method for making a coated article comprising the steps of: (1) selecting a substrate; (2) forming said substrate into article; (3) selecting the coating composition, as described hereinabove; (4) applying said the coating composition to at least one surface of said article; (5) removing at least a portion of the water from said the coating composition; (6) thereby forming one or more coating layers associated with at least one surface of said article; and (7) thereby forming said coated article.

In an alternative embodiment, the instant invention provides an aqueous dispersion, a coating composition, a coating layer, a coated article, method of producing the same, in accordance with any of the preceding embodiments, except that the one or more polyethylene terephthalate resins have a glass transition temperature ($T_g$) of at least 30° C.; for example at least 40° C.; or in the alternative, at least 50° C.; or in the alternative, at least 60° C.; or in the alternative, at least 70° C.; or in the alternative in the range of 30 to 130° C.

In an alternative embodiment, the instant invention provides an aqueous dispersion, a coating composition, a coating layer, a coated article, method of producing the same, in accordance with any of the preceding embodiments, except that the substrate is a pre-coated substrate.

In an alternative embodiment, the instant invention provides an aqueous dispersion, a coating composition, a coating layer, a coated article, method of producing the same, in accordance with any of the preceding embodiments, except that the substrate is metal, wood, paper, plastic, glass, leather, and/or concrete.

In an alternative embodiment, the instant invention provides an aqueous dispersion, a coating composition, a coating layer, a coated article, method of producing the same, in accordance with any of the preceding embodiments, except that the dispersion and/or the coating composition derived therefrom further comprises a catalyst.

In an alternative embodiment, the instant invention provides an aqueous dispersion, a coating composition, a coating layer, a coated article, method of producing the same, in accordance with any of the preceding embodiments, except that the one or more polyethylene terephthalate resins are linear saturated aromatic polyesters with a glass transition temperature of greater than 50° C. and an acid number of less than 5 mg KOH/g, and the second polyester is compatible with one or more polyethylene terephthalate resins, such that a dispersion with a volume average particle size of less than 5 microns is produced.

In an alternative embodiment, the instant invention provides an aqueous dispersion, a coating composition, a coating layer, a coated article, method of producing the same, in accordance with any of the preceding embodiments, except that the aqueous dispersion and/or the coating compositions derived therefrom further comprise one or more binder compositions such as acrylic latex, vinyl acrylic latex, styrene acrylic latex, vinyl acetate ethylene latex, polyurethane dispersion, alkyd dispersion, epoxy dispersion, polyolefin dispersion, and combinations thereof; optionally one or more fillers; optionally one or more additives such as catalysts, wetting agents, defoamers, flow agents, release agents, slip agents, anti-blocking agents, additives to mask sulfur staining, pigment wetting/dispersion agents, anti-settling agents, UV stabilizers, adhesion promoters; optionally one or more lubricants such as fatty acid ester wax, silicon-based wax, fluorine-based wax, polyethylene or any other similar polyolefin wax, carnauba wax, lanolin wax or the like; optionally one or more corrosion inhibitors such as aluminum, and zinc: optionally one or more pigments, e.g. titanium dioxide, barium sulfate, mica, calcium carbonate, silica, zinc oxide, milled glass, aluminum trihydrate, talc, antimony trioxide, fly ash, and clay or the like; optionally one or more co-solvents, e.g. glycols, glycol ether, 2,2,4-trimethyl-1,3-pentanediol monoisobutyrate, alcohols, mineral spirits, aromatic solvents and benzoate esters or the like; optionally one or more dispersants, e.g. aminoalcohols, and polycarboxylates; optionally one or more surfactants; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates; optionally one or more solvents or coalescing agents.

DETAILED DESCRIPTION OF THE INVENTION

The instant invention provides an aqueous dispersion, a coating composition, coating layers and coated article made therefrom.

The coating composition according to the present invention comprises: (1) the inventive aqueous dispersion comprising the melt blending product of: (a) from 50 to 99 percent by weight of one or more polyethylene terephthalate resins, based on the total solid content of the dispersion; (b) from 1 to 50 percent by weight of one or more stabilizing agents comprising at least one second polyester, based on the total solid content of the dispersion, wherein said second polyester (i) has a carboxylic acid group and an acid number equal to or greater than 15, for example equal or greater than 20, based on the solid content of the second polyester; or (ii) is a self-dispersing sulfopolyester; (c) one or more neutralizing agents; and (d) from 15 to 90 percent by weight of water, based on the total weight of the dispersion; wherein said dispersion has a solid content of 10 to 85 percent, based on the total weight of the dispersion; and (2) optionally one or more cross-linking agents.

Aqueous Dispersion

The aqueous dispersion according to the present invention comprises the melt blending product of: (a) from 50 to 99 percent by weight of one or more polyethylene terephthalate resins, based on the total solid content of the dispersion; (b) from 1 to 50 percent by weight of one or more stabilizing agents comprising at least one second polyester, based on the total solid content of the dispersion, wherein said second polyester (i) has a carboxylic acid group and an acid number equal to or greater than 15, for example equal or greater than 20, based on the solid content of the second polyester; or (ii) is a self-dispersing sulfopolyester; (c) one or more neutralizing agents; and (d) from 15 to 90 percent by weight of water, based on the total weight of the dispersion; wherein said dispersion has a solid content of 10 to 85 percent, based on the total weight of the dispersion.

One or More Polyethylene Terephthalate Based Resins

The aqueous dispersion comprises from 50 to 99 percent by weight of one or more polyethylene terephthalate resins based on the total weight of the solid content of the aqueous dispersion. All individual values and subranges from 50 to 99 weight percent are included herein and disclosed herein; for example, the weight percent can be from a lower limit of 50, 55, 60, 65, or 70 weight percent to an upper limit of 60, 65, 70, 75, 80, 85, 90, 95, or 99 weight percent. For example, the aqueous dispersion may comprise from 55 to 95 percent by weight of one or more polyethylene terephthalate resins, based on the total weight of the solid content of the aqueous dispersion; or in the alternative, the aqueous dispersion may comprise from 60 to 90 percent by weight of one or more polyethylene terephthalate resins, based on the total weight of the solid content of the aqueous dispersion; or in the alternative, the aqueous dispersion may comprise from 65 to 90 percent by weight of one or more polyethylene terephthalate resins, based on the total weight of the solid content of the aqueous dispersion; or in the alternative, the aqueous dispersion may comprise from 75 to 95 percent by weight of one or more polyethylene terephthalate resins, based on the total weight of the solid content of the aqueous dispersion. The aqueous dispersion comprises at least one or more polyethylene terephthalate resins.

The one or more polyethylene terephthalate resins are polyesters and copolyesters such as high molecular weight linear thermoplastic polyesters, with at least some degree of intrinsic crystallinity, in which the dicarboxylic acid monomer component used is predominantly terephthalic acid. These thermoplastic polyesters and copolyesters may have hydroxyl or carboxyl terminal groups; however the overall level of functionality is very low and is typically not reported. It is typically not necessary to croslink these polyesters in order to develop good physical properties. The polyesters and copolyesters are typically prepared by conventional polycondensation processes well known in the art, such as the process described in U.S. Pat. Nos. 2,901,466; 2,465,319 and 3,047,539, incorporated herein by reference to the extent that they disclose such processes. Typically, the thermoplastic polyester or copolyester will have a glass transition temperature of from 50 to 130° C., and a heat distortion temperature (ASTM D648 @ 264 psi (1.82 MPa)) of from 60 to 120° C. The molecular weight of the thermoplastic polyesters and copolyesters are typically expressed in terms of their intrinsic viscosities, which are in the range of from 0.5 to 1.0 Dl/g, as measured at 25° C., in a solvent mixture consisting of 60 wt % phenol and 40 wt % tetrachloroethane.

The dicarboxylic acid component of the thermoplastic polyesters and copolyesters is predominantly terephthalic acid (at least 50 mole % based on the total moles of diacid). Preferably the thermoplastic polyester or copolyester is composed of at least 80 mole % terephthalic acid, and most preferably at least 90 mole % terephthalic acid based on the total moles of diacid. In addition to the terephthalic acid, the dicarboxylic acid component can have up to 50 mole % of another modifying dicarboxylic acid. The modifying dicarboxylic acid comonomers are used to modify properties such as melting point, $T_g$, gas permeability, clarity, flexibility, impact resistance, rate of crystallization, hydrolytic stability, and resistance to solvents and other chemicals. Preferably, the thermoplastic polyester or copolyester contains less than 20 mole % of the modifying dicarboxylic acid, and most preferably less than 10 mole % of the modifying dicarboxylic acid.

Suitable modifying aromatic dicarboxylic acids include, but are not limited to, those having up to about 20 carbon atoms, including isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and the esters thereof. Suitable modifying aliphatic dicarboxylic acids include, but are not limited to, malonic, succinic, glutaric, adipic, pimelic, suberic, azaleic, and dodecanedioic acids. Preferably no more than 10 mole % of an aliphatic modifying dicarboxylic acid is used. The total mole % of the dicarboxylic component is 100 mole %.

The glycol component of the thermoplastic polyesters and copolyesters of the invention contains one or more of the following diols: ethylene glycol, 2,3 butane diol, 1,4 butane diol, 1,3-cyclohexanedimethanol, 1,4-cyclohexanedimethanol (or mixtures of 1,3 and 1,4 cyclohexanedimethanol, these may be cis or trans), and/or 2,2,4,4-tetramethyl-1,3-cyclobutanediol (may be cis, trans, or a mixture thereof).

In an exemplary embodiment, the glycol component contains 10-100 mole % ethylene glycol (based on the total moles of diol). In another exemplary embodiment, the glycol component contains 15-85 mole % ethylene glycol, and 15-85 mole % of one or more of the following diols: 1,4 butane diol 1,3-cyclohexanedimethanol, 1,4-cyclohexanedimethanol (or mixtures of 1,3 and 1,4 cyclohexanedimethanol, may be cis or trans), and/or 2,2,4,4-tetramethyl-1,3-cyclobutanediol (may be cis, trans, or a mixture thereof).

Additionally, the glycol component of the suitable copolyesters also can be modified with up to 10 mole % of other glycols having 3-40 carbon atoms, preferably less than 5 mole % of the modifying glycol. The modifying glycol comonomers are used to modify properties such as melting point, $T_g$, gas permeability, clarity, flexibility, impact resistance, rate of crystallization, hydrolytic stability, and resistance to solvents and other chemicals. Examples of suitable modifying glycols include, but are not limited to, 1,2-propanediol, neopentyl glycol, 1,3-propanediol, polyethylene glycols, polytetramethylene glycols, p-xylene glycol, diethylene glycol, triethylene glycol, glycol, tripropylene glycol and higher polypropylene glycols, butanediols, 1,5-pentanediol and other pentane diols, hexanediols, decanediols, and dodecanediols, glycerol, dipentaerythtritol, 1,3-butylene-ethylpropanediol, 2-methyl-1,3-propanediol, 1,4-benzyldimethanol, 2,4-dimethyl-2-ethylhexane-1,3-diol, isopropylidene bis(p-phenylene-oxypropanol-2), and mixtures thereof. In some embodiments, the aliphatic glycol may contain from 2 to about 8 carbon atoms, and mixtures thereof. The total mole % of the glycol component is 100 mole %.

Exemplary thermoplastic polyesters are described, for example, in U.S. Pat. No. 2,936,296, U.S. Pat. No. 5,955,565, and U.S. Pat. No. 5,859,116, incorporated herein by reference to the extent that such thermoplastic polyesters are described. Additional details on thermoplastic polyesters can be found in "Handbook of Thermoplastics", edited by Olagoke Olabisi and published by Marcel Dekker, Inc. (1997), ISBN 0-8247-9797-3. Pages 417-490. Suitable thermoplastic polyesters and copolyesters are available, for example, from Eastman Chemical under the trade names; CADENCE®, EASTAR®, SPECTAR®, PROVISTA®, DURASTAR®, EMBRACE®, & TRITAN®. This family of thermoplastic polyesters offers a range of molecular weights, glass transition temperatures and chemical structures that can offer advantageous properties in the water borne coatings applications of this invention.

The thermoplastic polyesters and copolyester resins have very limited ambient temperature solubility, in traditional solvents that are suitable for coating formulations. The current invention describes the discovery that waterborne dispersions of such thermoplastic polyesters and copolyesters, at high solids, can be made and successfully applied as liquids in high solids waterborne coating formulations.

Such thermoplastic polyesters and copolyesters include, but are not limited to, for example, PCT, PBT, PCTG, PET, PETG, PCTA, PETA, and PTT.

Stabilizing Agent Comprising a Second Polyester

The aqueous dispersion further comprises at least one or more stabilizing agents comprising one or more second polyesters to promote the formation of a stable dispersion. In one embodiment, the second polyester (i) has a carboxylic acid group and an acid number equal to or greater than 15, for example equal or greater than 20, based on the solid content of the second polyester; or (ii) is a self-dispersing sulfopolyester. In one embodiment, the second polyester has a carboxylic acid group and an acid number equal to or greater than 15, for example greater than 20. The aqueous dispersion comprises 1 to 50 percent by weight of one or more stabilizing agents, based on the total weight of the solid content of the dispersion. All individual values and subranges from 1 to 50 weight percent are included herein and disclosed herein; for example, the weight percent can be from a lower limit of 1, 3, 5, 10 weight percent to an upper limit of 15, 25, 35, 45, or 50 weight percent. For example, the dispersion may comprise from 1 to 25; or in the alternative, from 1 to 35; or in the alternative, from 1 to 40; or in the alternative, from 1 to 45 percent by weight of one or more stabilizing agents, based on the total weight of the solid content of the dispersion.

The carboxylated second polyester is a high acid, water dispersible, hydrophilic polyester, which is used as the primary stabilizing agent for dispersing the first polyester resin. The carboxylated second polyester typically has an acid number in the range of from greater than or equal to 15 mg KOH/g (based on resin solids), for example from 20 to 80 mg KOH/g (based on resin solids). The carboxylic acid functionality of the second polyester is critical to the present invention. In producing the waterborne dispersion, the acid functionality of the second polyester is neutralized with a suitable inorganic or organic base to provide colloidal stability. The high acid stabilizing polyester may also have hydroxyl functionality, but this is not required. Preferably the high acid stabilizing polyester has an OH number of at least 2 mg KOH/g (based on resin solids), preferably 5 mg KOH/g or greater, and most preferably 20 mg KOH/g or greater. The high acid stabilizing polyester may be produced by conventional polycondensation techniques such as for example described in Zeno W. Wicks, Jr, Frank N. Jones, S. Peter. Pappas "Organic Coatings, Science and Technology," pp 246-257 (John Wiley & Sons, 1999, second edition) and references therein or in Houben-Weyl, "Methoden der Organischen Chemie, Band E20, Makromolekulare Soffe, Polyester" pp 1405-1429. (Georg Thieme Verlag, Stuttgart 1987) and references therein. In one embodiment, a diol or polyol and a di-carboxylic acid or polycarboxylic acid are charged into a conventional polymerization vessel and reacted between about 150° C. and 280° C. for several hours. Optionally, an esterification catalyst may be used to decrease the reaction time. It may be preferable to use a two-step process to provide a carboxyl functional polyester. In one embodiment, an OH-functional polyester is first prepared so that there is little, if any, free carboxylic acid and/or carboxylate functions, and which then in a subsequent step is reacted with a cyclic dicarboxylic anhydride, in a ring-opening and monoester-forming reaction, with free carboxylic acid and/or carboxylate groups then being formed. The excess of OH functionality in the resin of the first step is designed in such a way that the final resin, after the reaction with the polyacid functional molecules, will provide a carboxyl terminated polyester resin in which the acid number is typically in the range of from equal to or greater than 15 mg KOH/g (based on resin solids), for example from 20 to 80 mg KOH/g (based on resin solids).

The carboxylic acid component of the high acid stabilizing polyester may contain one or more aliphatic, cycloaliphatic, araliphatic, and/or aromatic carboxylic acids with a COOH functionality of at least two, or anhydrides thereof. Suitable and typical dicarboxylic acids or polycarboxylic acids, or their corresponding alkyl esters, that may be used to form the high acid stabilizing polyester include, but are not limited to, saturated as well as unsaturated dicarboxylic acids such as, for example, but not limited to, maleic acid, maleic anhydride, malonic acid, fumaric acid, succinic acid, succinic anhydride, glutaric acid, adipic acid, 2-methyl-1,6-hexanoic acid, pimelic acid, suberic acid, dodecanedioic acids. phthalic acid, phthalic anhydride, 5-tert butyl isophthalic acid, tetrahydrophthalic anhydride, hexahydrophthalic acid, hexahydrophthalic anhydride, endomethylenetetrahydrophthalic anhydride, azelaic acid, fumaric acid, sebacic acid, tetrachlorophthalic anhydride, chlorendic acid, isophthalic acid, trimellitic anhydride, terephthalic acid, naphthalene dicarboxylic acid, cyclohexane-dicarboxylic acid, and mixtures thereof.

The glycol component of the high acid stabilizing polyester may be ethylene glycol, diethylene glycol, triethylene glycol and/or higher polyethylene glycols, propylene glycol, dipropylene glycol, tripropylene glycol and/or higher polypropylene glycols, 1,3-propanediol, 1,4-butanediol and other butanediols, 1,5-pentanediol and/or other pentane diols, hexanediols, decanediols, and/or dodecanediols, glycerol, trimethylolpropane, trimethylolethane, neopentyl glycol, pentaerythritol, cyclohexanedimethanol, a polyethylene or polypropylene glycol having a molecular weight of about 500 or less, dipentaerythtritol, 1,3-butyleethylpropanediol, 2-methyl-1,3-propanediol, 1,4-benzyldimethanol, 2,4-dimethyl-2-ethylhexane-1,3-diol, isopropylidene bis(p-phenylene-oxypropanol-2), and mixtures thereof. In some embodiments, the aliphatic glycol may contain from 2 to 8 carbon atoms 1,3-cyclohexanedimethanol, 1,4-cyclohexanedimethanol (or mixtures of 1,3 and 1,4 cyclohexanedimethanol, may be cis or trans), 2,2,4,4-tetramethyl-1,3-cyclobutanediol (may be cis, trans, or a mixture thereof) 4,4'-dihydroxy-2,2'-diphenylpropane or mixtures thereof.

The composition of the high acid stabilizing polyester (second polyester) must be chosen so that it exhibits good compatibility with the one or more polyethylene terephthalate resins. If the compatibility is poor, a good water borne dispersion with small particle size (typically less than about 5 micron volume average particle size diameter) and good stability may not be produced. In addition, resulting coatings from such dispersions may have poor appearance and may show reduced performance in coatings evaluation tests because of lack of compatibility. One way to assess compatibility is to melt mix the one or more polyethylene terephthalate resins and the second polyester at a temperature above their respective melting points. A blend with good compatibility will typically result in a relatively clear or translucent blend, while an incompatible blend will typically result in an opaque or hazy, white melt blend. There may be other methods to determine compatibility such as morphology determination by optical microscopy or transmission electron microscopy of the blend.

In another embodiment the stabilizing agent comprising a second polyester is a sulfopolyester that disperses directly in hot water without the assistance of neutralizing agents. The sulfopolyester consists essentially of (a) a dicarboxylic acid component comprising one or more sulfo monomers. Suitable sulfo monomers include, but are not limited to dimethyl-5-sodiosulfoisophthalate, and 5-sodiosulfoisophthalic acid. The dicarboxylic acid component typically also contains one or more conventional dicarboxylic acids used in the preparation of polyesters, including but not limited to, for example, isophthalic acid (b) a diol component consisting of one or more diols typically used in the manufacture of polyesters, including, but not limited to diethylene glycol, 1,4-cyclohexanedimethanol (cis or trans), 1,3-cyclohexanedimethanol (cis or trans), and mixtures thereof. The sulfo polyester will typically have a glass transition temperature (Tg) of between 20-60° C.

The useful sulfopolyesters in this invention are described in U.S. Pat. No. 3,546,008; U.S. Pat. No. 4,340,519; U.S. Pat. No. 3,734,874; U.S. Pat. No. 3,779,993; and U.S. Pat. No. 4,233,196 incorporated herein by reference to the extent that such sulfopolyesters disclosed. Useful sulfopolyesters are available from Eastman Chemical, such as, for example, Eastman AQ29, Eastman AQ38, and Eastman AQ55. Such suitable sulfopolyester are typically pre-neutralized.

The composition of the stabilizing polyester (second polyester) must be chosen so that it exhibits good compatibility with the first polyester. If the compatibility is poor, a good water borne dispersion with small particle size (typically less than about 5 micron volume average particle size diameter) and good stability may not be produced. In addition, resulting coatings from such dispersions may have poor appearance and may show reduced performance in coatings evaluation tests because of lack of compatibility. For example, if an aliphatic, high acid polyester (second polyester) is used to disperse an aromatic, hydrophobic first polyester, a poor dispersion will typically result with large particle size (typically greater than 5 micron volume average particle size diameter). One way to assess compatibility is to melt mix the first polyester and the second polyester at a temperature above their respective melting points. A blend with good compatibility will typically result in a relatively clear or translucent blend, while an incompatible blend will typically result in an opaque or hazy, white melt blend. There may be other methods to determine compatibility such as morphology determination by optical microscopy or transmission electron microscopy of the blend.

In selected embodiments, the stabilizing agent may optionally include a surfactant. Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

Additional stabilizing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS, DISPONIL TA-430, Disponil FES-32, and Diponil FES-993, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-455, TRITON H-55, TRITON GR-5M, TRITON BG-10, and TRITON CG-110, each available from The Dow Chemical Company, Midland, Mich. and ESPERSE grades E-100, E-506, E-328, E-355, and E-600, each available from Ethox Chemicals, LLC.

Additional stabilizing agents which could be used are solution or suspension polymers consisting of ethylenically unsaturated monomers such as acrylic and/or methacrylic acid and their ($C_1$-$C_{30}$) esters or amides; acrylamide/methacrylamide and their N-substituted derivatives; acrylonitrile; styrene and substituted styrene derivatives.

Exemplary polymeric stabilizing agents include, but are not limited to, amphiphilic copolymer compositions, the copolymer comprising the reaction product of (i) from 5 to 95 wt. % of one or more hydrophilic monomers and (ii) from 5 to 95 wt. % of one or more copolymerizable ethylenically unsaturated hydrophobic monomers. These materials are water soluble or emulsifiable, especially upon neutralization and can act as colloidal stabilizers. Exemplary stabilizing agents, for example, include, but are not limited to, butylacrylate and laurylmethacrylate.

Representative nonionic, water-soluble monomers suitable for production of amphiphilic copolymer compositions, include, but are not limited to, acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, t-butylacrylamide, N methylolacrylamide, alkyl(meth)acrylates such as methyl(meth)acrylate, butyl acrylate and ethylacrylate, vinyl monomers such as ethylene, styrene, divinylbenzene, di-isobutylethylene, vinyl acetate and N-vinyl pyrrolidone, and allyl monomers such as allyl (meth)acrylate.

Representative cationic, water-soluble monomers suitable for production of amphiphilic copolymer compositions include, but are not limited to, quaternary ammonium salts of amine functionalized monomers such as acrylamide, methacrylamide, N,N-dimethylacrylamide, N,N-diethylacrylamide, N-isopropylacrylamide, N-vinylformamide, N-vinylmethylacetamide, N-vinyl pyrrolidone, t-butylacrylamide, N-methylolacrylamide, tributylammonium ethyl(meth)acrylate TBAEMA, DMAEMA, DMAPMAM, diallyldimethylammonium chloride (DADMAC), methylacrylamidopropyltrimethylammonium chloride (MAPTAC), acrylamidopropyltrimethylammonium chloride (APTAC), N-vinyl pyrrolidone, vinylimidazole, polyquaternium-11 and polyquaternium-4.

"Anionic" or "acid-containing monomer" suitable for production of amphiphilic copolymer compositions include, but are not limited to, ethylenically unsaturated monomers containing carboxylic acid, phosphonic acid, phosphinic acid, sulfinic acid and sulfonic acid groups. Suitable examples include (meth)acrylic acid, maleic acid, succinic acid, itaconic acid, vinyl phosphonic acid and vinylsulfonic acid.

In an alternative embodiment, one or more stabilizing agents may be based on resins such as polyester, epoxy resins, polyamide resins, which might be reacted with acrylic resins or acrylic monomers to form polyester acrylate, polyamide acrylates epoxy resin acrylates.

Polyester acrylates as stabilizing agents may be formed via in-situ polymerization of copolymerizable ethylenically unsaturated monomers in presence of polyesters. Examples include ethylenically unsaturated mono- or polyfunctional acids, ethylenically unsaturated mono- or polyfunctional acid esters, amides, nitriles as well as vinyl monomers and vinyl ester with a polyester in or without presence of a reaction fluid. Polyester acrylates in solvents can be dried according to suitable methods known to those of ordinary skill in the art.

Suitable epoxy resins for producing stabilizing agents may be obtained in accordance with conventional procedures well known to those of ordinary skill in the art by reacting a polyepoxide with a suitable polynucleophile. Suitable epoxides include, but are not limited to, glycidyl ethers, and other epoxy group containing molecules. Suitable polynucleophiles include, but are not limited to, polyhydric phenols, and poly phenols, polythiols, aliphatic polyalcohols or polybasic acids or polyamines. Exemplary suitable epoxies, for example, include, but are not limited to, glycidyl ether that contains at least two glycidyl ether groups per polyglycidyl ether molecule (e.g. an at least diglycidyl ether) with a polyhydric phenol that contains at least two hydroxyl groups in the polyhydric polyphenol (e.g., at least dihydric phenol or a diphenol) in presence of a conventional catalyst at an elevated temperature with or without solvent present. Another class of epoxy resins may be obtained in accordance with conventional procedures well known to those of ordinary skill in the art by reacting, for example, a polyglycidyl ether that contains at least two glycidyl ether groups per polyglycidyl ether molecule (e.g. an at least diglycidyl ether) with a polybasic acid that contains at least two carboxyl groups per polybasic acid molecule (e.g. an at least dibasic polycarboxylic acid) in presence of a conventional catalyst at an elevated temperature with or without solvent present.

Epoxy acrylates for producing stabilizing agents may be formed via in-situ polymerization of copolymerizable ethylenically unsaturated monomers in presence of epoxy resins. Examples include, but are not limited to, ethylenically unsaturated mono- or polyfunctional acids, ethylenically unsaturated mono- or polyfunctional acid esters, amides, nitriles as well as vinyl monomers and vinyl ester with an epoxy resins in or without presence of a reaction fluid. Alternatively a polymeric acid functional acrylic resin can be reacted with an epoxy resin in the presence of a suitable catalyst to form epoxy acrylate. Epoxy acrylates in solvents can be dried according to suitable methods known to those of ordinary skill in the art. In one embodiment, the surfactant may comprise the reaction product of an acid functionalized polyester and an epoxy resin.

In one embodiment, the stabilizing agent comprising a second polyester, which is acid functionalized oligomer derived from a PET based polyester.

Neutralizing Agent

The stabilizing agent may be partially or fully neutralized with a neutralizing agent. In certain embodiments, neutralization of the stabilizing agent, the second polyester, may be from 50 to 250 percent on a molar basis; or in the alternative, it may be from 50 to 200 percent on a molar basis; or in the alternative, it may be from 50 to 150 percent on a molar basis; or in the alternative, it may be from 50 to 120 percent on a molar basis. For example, the neutralizing agent may be a base, such as ammonium hydroxide, sodium hydroxide, or potassium hydroxide. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include diethanolamine, triethanolamine, and TRIS AMINO™ (each available from Angus), NEUTROL™ TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, butylamine, dibutylamine, tributylamine, dimethyl benzyl amine, dimethyl n-propylamine, N-methanol amine, N-aminoethylethanolamine, N-methyldiethanolamine, monoisopropanolamine, N,N-dimethyl propanolamine, 2-amino-2-methyl-1-propanol, 1,2-diaminopropane, tris(hydroxymethyl)-aminomethane, ethylenediamine N,N,N'N'-tetrakis(2-hydroxylpropyl)ethylenediamine, N,N,N',N' tetramethylpropanediamine, 3-methoxypropyl amine, imino bis-propyl amine and the like. In some embodiments, mixtures of amines or mixtures of amines and other surfactants may be used. In one embodiment, the neutralizing agent may be a polymeric amine, e.g. diethylene triamine. Those having ordinary skill in the art will appreciate that the selection of an appropriate neutralizing agent depends on the specific composition formulated, and that such a choice is within the knowledge of those of ordinary skill in the art. In one embodiment, amines with boiling points below 250° C. may be used as the neutralizing agents.

Fluid Medium

The aqueous dispersion further comprises a fluid medium. The fluid medium may be any medium; for example, the fluid medium may be water. The aqueous dispersion comprises from 15 to 90 percent by weight of water, based on the weight of the dispersion; for example, the dispersion comprises from 20 to 85 percent by weight of water, based on the weight of the dispersion; or in the alternative from 30 to 75 percent by weight of water, based on the weight of the dispersion; or in the alternative from 40 to 75 percent by weight of water, based on the weight of the dispersion; or in the alternative from 40 to 65 percent by weight of water, based on the weight of the dispersion. Water content of the dispersion may preferably be controlled so that the solids content (one or more polyethylene terephthalate resins plus stabilizing agent comprising a second polyester) is in the range of from 10 to 85 percent by weight, based on the weight of the dispersion. For example, the dispersion comprises from 20 to 70 percent by weight of solid contents (one or more polyethylene terephthalate resins plus stabilizing agent comprising a second polyester), based on the weight of the dispersion; or in the alternative, from 25 to 70 percent by weight of solid contents (one or more polyethylene terephthalate resins plus stabilizing agent comprising a second polyester), based on the weight of the dispersion; or in the alternative, from 35 to 70 percent by weight of solid contents (one or more polyethylene terephthalate resins plus stabilizing agent comprising a second polyester), based on the weight of the dispersion; or in the alternative, from 35 to 65 percent by weight of solid contents (one or more polyethylene terephthalate resins plus stabilizing agent comprising a second polyester), based on the weight of the dispersion; or in the alternative, from 40 to 70 percent by weight of solid contents (one or more polyethylene terephthalate resins plus stabilizing agent comprising a second polyester), based on the weight of the dispersion; or in the alternative, from 40 to 65 percent by weight of solid contents (one or more polyethylene terephthalate resins plus stabilizing agent comprising a second polyester), based on the weight of the dispersion; or in the alternative, from 45 to 65 percent by weight of solid contents (one or more polyethylene terephthalate resins plus stabilizing agent comprising a second polyester), based on the weight of the dispersion; or in the alternative, from 50 to 70 percent by weight of solid contents (one or more polyethylene terephthalate resins plus stabilizing agent comprising a second polyester), based on the weight of the dispersion.

The fluid medium may optionally contain one or more suitable solvents. For example the one or more optional solvents include but are not limited to, e.g. glycols, glycol ether, 2,2,4-trimethyl-1,3-pentanediol monoisobutyrate, alcohols, ketones, glycol ether esters, mineral spirits, aromatic solvents and/or esters or the like; optionally one or more dispersants, e.g. aminoalcohols, and/or polycarboxylates.

Additional Components

The aqueous dispersion of the present invention may optionally be blended with one or more binder compositions such as acrylic latex, vinyl acrylic latex, styrene acrylic latex, vinyl acetate ethylene latex, epoxy dispersion, polyurethane dispersion, alkyd dispersion, polyolefin dispersion, and combinations thereof; optionally one or more fillers; optionally one or more additives such as catalysts, wetting agents, defoamers, flow agents, release agents, slip agents, anti-blocking agents, additives to mask sulfur staining, pigment wetting/dispersion agents, anti-settling agents, UV stabilizers, adhesion promoters; optionally one or more lubricants such as fatty acid ester wax, silicon-based wax, fluorine-based wax, polyethylene or any other similar polyolefin wax, carnauba wax, lanolin wax or the like; optionally one or more corrosion inhibitors such as aluminum, and zinc: optionally one or more pigments, e.g. titanium dioxide, barium sulfate, mica, calcium carbonate, silica, zinc oxide, milled glass, aluminum trihydrate, talc, antimony trioxide, fly ash, and clay or the like; optionally one or more co-solvents, e.g. glycols, glycol ether, 2,2,4-trimethyl-1,3-pentanediol monoisobutyrate, alcohols, mineral spirits, aromatic solvents and benzoate esters or the like; optionally one or more dispersants, e.g. aminoalcohols, and polycarboxylates; optionally one or more surfactants; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates; optionally one or more solvents or coalescing agents.

In addition, the aqueous dispersion may be blended with one or more dispersions, emulsions, suspensions, colloidal suspensions, and the like.

For example the aqueous dispersion of the invention may be blended with polyurethane dispersion, alkyd dispersion, epoxy dispersion, polyolefin dispersion, vinyl acetate emulsion, acrylic emulsion, vinyl acetate ethylene emulsion, and/or the like. The addition of the additional components, as described herein, may be achieved as part of the process for making the dispersion, i.e. the additional components are added while producing the aqueous dispersion; or in the alternative, the additional components may added post aqueous dispersion production, i.e. the additional components are added into the aqueous dispersion after the dispersion is produced; or in the alternative, combinations thereof, i.e. additional components may be added during the process for making the dispersion and additionally such additional components are added post dispersion production as well.

Crosslinking Agent

The aqueous dispersion may optionally further comprise at least one or more crosslinking agents to promote crosslinking and/or optionally one or more catalyst to increase the rate of crosslinking. Such catalysts are generally known, and the selection of suitable catalyst typically depends on the selection of the crosslinking agent and other factors such as conditions for such crosslinking. Such catalysts include, but are not limited to, depending on type of crosslinker—strong acids, weak acids or compounds containing metals, such as dodecyl benzene sulfonic acid, p-toluene sulfonic acid, dinonylnaphtalene disulfonic acid, methane sulfonic acid, phosphoric acid or weak acids such as ammonium or phosphonium salts or tin, bismuth, zirconium or aluminum chelate compounds. Exemplary catalysts include, but are not limited to, NACURE™, K-Kure™ and K-Kat™, available from King Industries, CYCAT™ from Cytec Industries, and/or FASCAT™ from Arkema Inc. The aqueous dispersion of the instant invention comprises 0.5 to 50 percent by weight of one or more crosslinking agents, based on the total weight of the solid content of the dispersion. All individual values and subranges from 0.5 to 50 weight percent are included herein and disclosed herein; for example, the weight percent can be from a lower limit of 0.5, 1, 3, 5, 10. 15, or 20 weight percent to an upper limit of 10, 12, 15, 18, 20, 25, 30, 35, 40, 45, or 50 weight percent. For example, the dispersion may comprise from 1 to 18; or in the alternative, from 1 to 15; or in the alternative, from 1 to 12; or in the alternative, from 1 to 10; or in the alternative, from 1 to 20; or in the alternative, from 1 to 30; or in the alternative, from 1 to 40; or in the alternative, from 1 to 45; or in the alternative, from 1 to 50 percent by weight of one or more crosslinking agents, based on the total weight of the solid content of the dispersion. In selected embodiments the crosslinking agent may, for example, be phenol-formaldehyde resins, amino-formaldehyde resins including, but not limited, to urea-formaldehyde resins, melamine formaldehyde resins, benzoguanamine formaldehyde resins, anhydride resins, epoxy group containing resins such as epoxy resins, epoxy group containing polyester or acrylic resins and blocked or unblocked isocyanate resins, and combinations of two or more thereof, provided that the combinations of such crosslinkers is compatible.

Crosslinking agent may be a compound, which reacts with a reactive functional group contained in the dispersion formulation; thereby facilitating their crosslinking. Such functional groups can be present in both the one or more polyethylene terephthalate resins as well as the stabilizing agent comprising a second polyester.

For example, reactive functional groups include, but are not limited to, acid groups such as carboxylic acid groups, free or in the neutralized form, or any functional groups having another active hydrogen by another component such as alcohol groups, amino groups, epoxy groups, or the like.

Crosslinkable functional groups in the cross-linking agent are groups capable of reacting with the reactive functional group of the first polyester or the stabilizing agent comprising a second polyester. For example, a carbodiimide group, an oxazoline group, an isocyanate group, an epoxy group, a methylol group, an aldehyde group, an acid anhydride group, a hydroxy group, an aziridinyl group or a silane group can be used in a crosslinker.

Another possibility of crosslinking acid functional groups is by use of multivalent metal ions by reaction of the aforementioned acid groups with a multivalent metal ion containing substance, such as zinc oxide.

Carboxylic acids could also be crosslinked in reactions with multifunctional olefinic unsaturated substances under catalysis of a strong acid. Multifunctional carbonates could also react with carboxylic acids to give ester linkages with liberation of carbon dioxide.

In the alternative, crosslinking may be accomplished via free radical crosslinking, initiated by addition of peroxides or via radiation, e.g., electron beam.

With respect to crosslinkable functional groups, one or more may be present in a crosslinking agent. In the alternative, two or more crosslinkable functional groups may be present in a single molecule.

The cross-linking agent having the above described crosslinkable functional group may be a waterdispersed or waterdispersible or water-soluble substance. In one embodiment, exemplary crosslinking agents include, but are not limited to, an aqueous monomeric or polymeric substance, which contains two or more oxazoline groups, carbodiimide groups, epoxy groups, isocyanate groups, methylol groups etc. or several of these per molecule.

An exemplary oxazoline crosslinking agent is an aqueous polymer having two or more oxazoline groups in its molecules, substances can be obtained by polymerizing an oxazoline group-containing monomer and, as required, an ethylenic unsaturated monomer. Alternatively an oxazoline crosslinking agent can also be obtained by reaction between a nitrile group and an aminoethanol group, dehydration of a hydroxylalkylamide group and the like.

Crosslinking agents having two or more carbodiimide groups can be produced from diisocyanate compounds by a condensation reaction accompanied by decarboxylation reaction of a diisocyanate compound. Examples of the diisocyanate compound include, but are not limited to, 1,5-naphthylene diisocyanate, 4,4'-diphenylmethane diisocyanate, 4,4'-diphenyldimethylmethane diisocyanate, 1,4-phenylene diisocyanate, 2,4-tolylene diisocyanate, 2,6-tolylene diisocyanate, hexanemethylene diisocyanate, cyclohexane-1,4-diisocyanate, xylylene diisocyanate, isophorone diisocyanate, dicyclohexylmethane-4,4'-diisocyanate, methylcyclohexane diisocyanate, and tetramethylxylylene diisocyanate and the like. These compounds may also be used as mixtures.

Monofunctional isocyanates may be included to control the resin molecular chain length such as phenyl isocyanate, tolyl isocyanate, cyclohexylisocyanate, dimethylphenyl isocyanate, butylisocyanate, and naphthyl isocyanate are useful.

Diisocyanate substances may be partially reacted with aliphatic compounds, alicyclic compounds, or aromatic compounds having a hydroxyl group, an imino group, an amino group, a carboxyl group, a mercapto group, an epoxy group, and the like.

In the condensation reaction accompanied by decarboxylation of a diisocyanate compound, a carbodiimidization catalyst can be used. Usable as such a catalyst are, for example, phosphorene oxides such as 1-phenyl-2-phospholene-1-oxide, 3-methyl-2-phospholene-1-oxide, 1-ethyl-2-phospholene-1-oxide, and 3-phospholene isomers thereof.

In order to convert a carbodiimide group-containing polymer into an aqueous polymer, a hydrophilic segment is provided in the molecular structure of the carbodiimide group-containing polymer. For example, an aqueous polymer containing a carbodiimide group can be obtained by providing a hydrophilic segment having a functional group which has reactivity with an isocyanate group. Usable as the hydrophilic segment are: quaternary ammonium salts of dialkylamino alkylamine (e.g., quaternary ammonium salts of 2-dimethylaminoethanol); quaternary salts of dialkylamino alkylamine (e.g., 3-dimethylamino-n-propylamine); alkyl sulfonic acid salts having at least one reactive hydroxyl group (e.g., sodiumhydroxypropanesulfonate); a mixture of polyethylene oxide or polyethylene oxide, whose terminal is capped with an alkoxy group, and a polypropylene oxide (e.g., polyethylene oxide whose terminal position is capped with a methoxygroup or an ethoxy group).

As an aqueous cross-linking agent containing an epoxy group, there are exemplified sorbitol polyglycidyl ether, glycerol triglycidyl ether, polyglycerol polyglycidylether trimethylolpropane triglycidyl ether, poly(ethyleneglycol)diglycidyl ether, poly(propyleneglycol)diglycidyl ether, phenol ethyleneoxide glycidyl ether, and lauryl alcohol ethyleneoxide glycidyl ether or the like. In addition to the above, mentioned as examples are: a water-soluble epoxy resin obtained by reacting a carboxy compound, which is obtained through a reaction between a polyoxyethylene polyol compound and an acid anhydride compound, and an epoxy resin having two or more epoxy groups in its molecules; and a self-emulsifiable epoxy resin composition obtained by mixing the water-soluble epoxy resin and the epoxy resin having two or more epoxy groups in its molecules. Such resins can be obtained for example under the tradenames of XZ 92533.00, XZ 92598.00 and XZ 92446.00 from The Dow Chemical Company, Midland, Mich. Examples of the anhydride compound include, but not particularly limited to, preferably aromatic anhydrides such as phthalic anhydride, trimellitic anhydride, and pyromellitic anhydride; and cyclic aliphatic anhydrides such as maleic anhydride, succinic anhdyride, tetrahydrophthalic anhydride, methyl tetrahydrophthalic anhydride, methyl nadic anhydride, alkenyl succinic anhdyride, hexahydrophthalic anhydride, and methyl hexahydrophthalic anhydride. There is no limitation on the epoxy resin having two or more epoxy groups in its molecules, and all known epoxy resins with an epoxy functionality of greater or equal to two can be used. Examples are polyglycidyl ether obtained from epichlorohydrin and a polyhydric compound such as, phenol novolac, and cresol novolac bisphenol A, bisphenol F, bisphenol S, resorcinol, hydroquinone or catechol; alkylene oxide-added bisphenol A; polyalcohols such as polypropylene glycol, 1,6-hexanediol, trimethylol propane, glycerin, cyclohexanedimethanol; and polyglycidyl ester and polyglycidyl amine of polycarboxylic acids such as adipic acid, phthalic acid, dimer acid and the like.

Aqueous cross-linking agent containing an isocyanate group are, for example: polyisocyanate mainly containing at least one member selected from the group consisting of an isocyanurate group-containing polyisocyanate, an urethodione group-containing polyisocyanate, an urethodione group/isocyanurate group containing polyisocyanate, an urethane group containing polyisocyanate, an allophanate group containing polyisocyanate, a biuret group containing polyisocyanate, a carbodiimide group containing polyisocyanate, and an uretodione group containing polyisocyanate, each of which contains 1,6-hexamethylene diisocyanate and/or isophorone diisocyanate as a raw material; and a self-emulsifiable polyisocyanate obtained by reacting a hydrophilic surfactant having at least one active hydrogen group which can react with an isocyanate group or polyethylene ether alcohol containing at least three poly-ethylene oxide units with fatty acid ester in which the sum of the number of carbons of fatty acid and a hydroxyl containing compound as raw materials is 8 or more and which has at least one active hydrogen group which can react with an isocyanate group. In addition to the above, an urethane group-containing polyisocyanate obtained by reaction between 1,6-hexamethylenediisocyanate and/or an isophorone diisocyanate and an active hydrogen group-containing compound or polyisocyanate obtained by an allophanatization reaction, carbodiimidization reaction, uretodionization reaction, and biuretization reaction of these diisocyanate compounds can be mentioned.

Examples of suitable crosslinking agents containing an aldehyde are water dispersed or waterdispersible or water-soluble phenol formaldehyde resins, amino formaldehyde resins or combinations thereof.

Phenol formaldehyde crosslinking agents include, but are not limited to, reaction products of aldehydes with phenols. Preferred aldehdydes but not exclusive are formaldehyde and acetaldehyde. A large variety of phenols can be used such as but not exclusive phenol, cresol, p-phenylphenol, p-tert-butylphenol, p-tert-amylphenol, cyclopentylphenol, cresylic acid, bisphenol-A, bisphenol-F and the like and combinations thereof. Also acid functional phenols could be used in making phenol formaldehyde resins. The crosslinkers can be unetherified or etherified with alcohols or polyols. These phenol formaldehyde resins may be soluble or self-emulsifiable in water or can be stabilized by use of colloid stabilizers such as polyvinyl alcohol.

Amino formaldehyde crosslinking agents include, but are not limited to, reaction products of aldehydes with amino or amido group containing molecules. Exemplary aldehydes include, but are not limited to, formaldehyde and acetaldehyde. A large variety of amino or amido group containing molecules can be used such as but not exclusive urea, melamine, benzoguanamine, acetoguanamine, glycoluril and the like. Suitable amino crosslinking resins include melamine-formaldehyde, urea-formaldehyde, benzoguanamine-formaldehyde, acetoguanamine-formaldehyde, glycoluril-formaldehyde resins. Also the methylol groups of an amino formaldehyde resin can be partially or fully etherified with at least one of the groups of monohydric aliphatic alcohols such as methanol and/or n-butanol. These amino formaldehyde resins may be soluble or self-emulsifiable in water or can be stabilized by use of colloid stabilizers such as polyvinyl alcohol can be used to stabilize the amino formaldehyde dispersions.

Commercially available amino-formaldehyde resins which are water soluble or water dispersible and useful for the instant purpose include Cymel™ 301, Cymel™ 303, Cymel™ 370, and Cymel™ 373 (all being products of Cytec Surface Specialties, Brussels, Belgium). Other aldehydes used to react with the amino compound to form the resinous material are crotonic aldehyde, acrolein, or compounds which generate aldehydes, such as hexamethylene-tetramine, paraldehyde, and the like.

Another class of crosslinking agents for carboxylic acid groups are water-soluble hydroxyalkylamide crosslinkers such as Bis(N,N'-dihydroxyethyl)adipamide and the like. Such compounds are commercially available under the tradename of PRIMID™ crosslinker resins from EMS-PRIMID in Switzerland, for example PRIMID™ XL-522, PRIMID™ SF-4510 and PRIMID™ QM-1260

The one or more crosslinking agents may be added to the aqueous dispersion as part of the aqueous dispersion formulation process; or in the alternative, the one or more crosslinking agents may be added to the aqueous dispersion post dispersion formulation process.

In one embodiment, depending on the type of food or beverage which is to be contained in a coated container, and on required coating properties it may be beneficial to combine several crosslinkers or some crosslinkers may be more suited than others. Some crosslinkers may not be suited for all applications. Some crosslinkers may require the addition of catalysts for proper cure.

Crosslinkers will help to build thermoset networks, which is indicated by higher values of MEK Double Rubs compared to an identical formulation not containing the crosslinker.

Forming the Dispersion

The aqueous dispersion can be formed by any number of methods recognized by those having skill in the art. Dispersion equipment can be operated in batch, semi-batch, or continuous mode. Examples of mixers include rotor-stator, microfluidizer, high pressure homogenizer, ultrasonic, impinging jet, Cowles™ blade, planetary mixers, and melt kneading devices such as extruders.

In one embodiment, one or more polyethylene terephthalate resins, one or more stabilizing agents comprising a second polyester are melt-kneaded in an extruder along with water and optionally one or more neutralizing agents, such as ammonia, potassium hydroxide, amine, or a combination of two or more, to form a dispersion. In another embodiment, one or more polyethylene terephthalate resins, one or more stabilizing agents comprising a second polyester are compounded, and then melt-kneaded in an extruder in the presence of water, and optionally one or more neutralizing agents thereby forming a dispersion. In some embodiments, the dispersion is first diluted to contain from 1 to 20 percent, e.g., 1 to 5 percent or 1 to 3 percent, by weight of water, and then, subsequently, further diluted to comprise from 15 to 90 percent by weight of water, based on the weight of dispersion. In one embodiment, further dilution may be accomplished via a solvent.

In one embodiment, the dispersion is free of any solvent. Any melt-kneading means known in the art may be used. In some embodiments, a kneader, a BANBURY® mixer, single-screw extruder, or a multi-screw extruder, e.g. a twin screw extruder, melt pump in connection with a rotor stator is used. A process for producing the dispersions in accordance with the present invention is not particularly limited. For example, an extruder, in certain embodiments, for example, a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used, but in some embodiments, for example, a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

One or more polyethylene terephthalate resins, in the form of, for example, pellets, powder, or flakes, are fed from the feeder to an inlet of the extruder where the resin is melted or compounded. One or more additional components may optionally be fed simultaneously with one or more polyethylene terephthalate resins into the extruder via the feeder; or in the alternative, one or more additional components may be compounded into one or more polyethylene terephthalate resins, and then fed into the extruder via the feeder. In the alternative, additional one or more additional components may optionally further be metered via an inlet prior to the emulsification zone into the molten compound comprising one or more polyethylene terephthalate resins. In some embodiments, the stabilizing agent comprising a second polyester is added to one or more polyethylene terephthalate resins through and along with the one or more polyethylene terephthalate resins and in other embodiments, the stabilizing agent comprising a second polyester is provided separately to the twin screw extruder. The resin melt is then delivered from the mix and convey zone to an emulsification zone of the extruder where the initial amount of water and base from the water and base reservoirs are added through an inlet. In some embodiments, stabilizing agent comprising a second polyester may be added additionally or exclusively to the water stream. In some embodiments, further dilution water may be added via water inlet from water reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, the dispersion is further cooled after exiting the extruder by the use of a suitable heat exchanger. In other embodiments, water is not added into the twin screw extruder but rather to a stream containing the resin melt after the melt has exited from the extruder. In this manner, steam pressure build-up in the extruder is eliminated and the dispersion is formed in a secondary mixing device such as a rotor stator mixer.

In another embodiment, the aqueous dispersion can be formed in a continuous high shear mixer without the use of a melt kneading extruder. In this embodiment, the first stream comprising one or more liquid or molten polyethylene terephthalate resins is supplied to a continuous high shear mixer from a suitable liquid pump for example, a syringe pump, gear pump, or progressive cavity pump. The first stream is flowed through a first conduit and merged continuously with a second stream containing a continuous aqueous phase that is flowed through a second conduit. The first and second streams are merged into a disperser in the presence of a stabilizing agent comprising a second polyester with optional neutralizing agent. The agents can be added to either the first or second stream, or as a separate stream. A third stream comprising water can be added downstream from the disperser. The flow rates of the streams are adjusted to achieve a dispersion having the desired amount of polymer phase and percent solids. The disperser can be any one of a number of continuous inline mixers, for example, an IKA high-shear mixer, Oakes rotor stator mixer, Ross mixer, Silverson mixer, or centrifugal pump. The rpm setting of the disperser can be used to help control the particle size of the dispersed hydrophobic phase in the dispersion. The system can be heated to provide the polymer and neutralizer components at a suitable viscosity for pumping. Steam formation is reduced by controlling the pressure through the use of a backpressure regulator, gear pump, metering pump, or other suitable device near the exit of the process. In some embodiments, the dispersion is further cooled after exiting the disperser by the use of a suitable heat exchanger.

In another embodiment, the aqueous dispersion can be formed in a batch or semi-batch high shear mixer where the mixer may, for example, be disposed within a pressurized tank to, for example, reduce steam formation. All or at least a portion of the dispersion is removed from the tank during processing, and optionally cooled by the use of a suitable heat exchanger.

During the preparation of the aqueous dispersion, optionally one or more fillers; optionally one or more additives such as catalysts, wetting agents, defoamers, flow agents, release agents, slip agents, anti-blocking agents, additives to mask sulfur staining, pigment wetting/dispersion agents, anti-settling agents, UV stabilizers, adhesion promoters; optionally one or more lubricants such as fatty acid ester wax, silicon-based wax, fluorine-based wax, polyethylene or any other similar polyolefin wax, carnauba wax, lanolin wax or the like; optionally one or more corrosion inhibitors such as aluminum, and zinc: optionally one or more pigments, e.g. titanium dioxide, mica, calcium carbonate, barium sulfate, silica, zinc oxide, milled glass, aluminum trihydrate, talc, antimony trioxide, fly ash, and clay or the like; optionally one or more dyes; optionally one or more co-solvents, e.g. glycols, glycol ether, 2,2,4-trimethyl-1,3-pentanediol monoisobutyrate, alcohols, mineral spirits, and benzoate esters or the like; optionally one or more dispersants, e.g. aminoalcohols, and polycarboxylates; optionally one or more surfactants; optionally one or more defoamers; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates may be added to the aqueous dispersion formulation; or in the alternative, may be added to the dispersion post dispersion formulation process.

During the preparation of the aqueous dispersion, one or more crosslinking agents may also be added to the aqueous dispersion formulation; or in the alternative, may be added to the dispersion post dispersion formulation process.

Optionally during the dispersion of the one or more polyethylene terephthalate resins, another polymer dispersion or emulsion may be used as a portion of the aqueous phase of the dispersion. Examples include, but are not limited to, acrylic, epoxy, polyester, polyurethane, polyolefin, polyamide, alkyd, and the like containing dispersions, emulsions, suspensions, colloidal suspensions.

In one embodiment, the method for producing the inventive aqueous dispersion comprises the steps of: (1) selecting one or more polyethylene terephthalate resins; (2) selecting one or more stabilizing agents comprising at least one second polyester having an acid number equal to or greater than 15, for example greater than 20; (3) selecting one or more neutralizing agents; (4) melt-blending said one or more first polyesters, one or more stabilizing agents in the presence of water and one or more neutralizing agents; (4) thereby producing an aqueous dispersion having a solid content of 10 to 74 percent, based on the total weight of the dispersion.

Coating Applications and Forming Coated Containers or Closure Devices

The aqueous dispersion and/or coating composition derived therefrom may be used on any suitable substrate including, but not limited to metal, wood, plastic, leather, glass, concrete, and the like. In one embodiment the aqueous dispersion and/or coating derived therefrom may be used. In one embodiment the aqueous dispersion and/or coating derived therefrom may be used, for example, in container, e.g. can, coating application, or closure device coating application. Such coated container devices include, but are not limited to, cans such as beverage cans, food cans; aerosol containers such as those for non-food products, e.g. hair spray, hair dye, or color spray lacquers; drums; kegs; pails; decorative tins; open trays; tubes, bottles, monoblocs, and the like. The coated articles such as closure devices include, but are not limited to, caps, lids such as thin aluminum foil based lids for yogurt and butter containers, or crown corks; closures for glass jars and bottles such as roll-on closures, vacuum closures, pilfer-proof closures, easy peel lids for can closures, and easy open end or conventional ends for cans. Cans may be 2 piece cans or 3 piece cans. Beverage cans include, but are not limited to, beer cans, carbonated soft drink cans, energy drink cans, isotonic drink cans, water cans, juice cans, tea cans, coffee cans, milk cans, and the like. Food cans, include, but are not limited to, vegetable cans, fruit cans, meat cans, soup cans, ready meal cans, fish cans, edible oil cans, sauce cans and the like. Such cans may have any shapes; for example, such can may have a cylindrical shape, cubical, spherical, semi-spherical, bottle shape, elongated cubical shape, shallow or tall shape, round or rectangular shape or any other suitable shape. The coated articles such as container devices according to the instant invention may be formed via any conventional method. For example, the coated container device may be formed via stamping, drawing, redrawing, wall ironing, bending, beading, embossing, debossing, flanging, necking, stretching, blow-stretching and any other suitable conventional method. Such methods are generally known to those having ordinary skill in the art. The aqueous dispersion and/or coating composition derived therefrom may, for example, be applied to a substrate, e.g. metal sheet or metal foil, and then the coated substrate may be formed into a coated container device or a coated closure device. In the alternative, a substrate may be formed into a container device or a closure device, and then the container device or the closure device is coated with one or more aqueous dispersions and/or coating composition derived therefrom to form the coated container device or coated closure device. The coating may be applied via any method; for example, via roller coating, spray coating, powder coating, dip coating, electrodeposition coating, printing, wash coating, flow coating, curtain coating.

The substrate comprises one or more metals including, but not limited to, aluminum and aluminum alloys, electrolytic tinplate cold rolled low carbon mild steel ("ETP"), electrolytic chromium/chromium oxide coated cold rolled low carbon mild steel (ECCS), and any other pre-treated steel, or one or more polymers such as one or more polyolefins, e.g. polyethylene and/or polypropylene. Pretreatment may include, but is not limited to, treatment with phosphoric acid, zirconium phosphate, chromium phosphate, and the like as well as silanes for reasons such as primary corrosion protection and improved adhesion. The substrate may comprise a sheet, strip or a coil. The substrate may comprise one or more layers, and each layer may have a thickness in the range of from 0.01 μm to 2 mm; for example, from 0.01 μm to 1.5 mm; or in the alternative, from 0.01 μm to 1 mm; or in the alternative, from 0.01 μm to 0.5 mm; or in the alternative, from 0.01 μm to 0.2 mm; or in the alternative, from 0.01 μm to 0.1 mm or in the alternative, from 0.01 μm to 100 μm; or in the alternative, from 0.01 μm to 50 μm; or in the alternative, from 1 μm to 50 μm; or in the alternative, from 1 μm to 15 μm. The substrate may be pre-coated with one or more pre-coating compositions. Such pre-coating compositions may optionally further include, but are not limited to, one or more resin binders, one or more resin crosslinkers, one or more solvents, one or more additives, and one or more pigments. Exemplary resin binders include, but are not limited to, epoxy, polyester, polyvinyl chloride containing organosols/vinyls, phenolic, alkyd, oleoresin, acrylic resin, and the like. Exemplary crosslinkers include, but are not limited to, phenol-formaldehyde resins; amino-formaldehyde resins including but not limited to urea-formaldehyde, melamine formaldehyde, benzoguanamine formaldehyde; anhydride resins, blocked isocyanate resins and epoxy groups containing resins, including but not limited to, epoxy resins, epoxy groups containing polyesters, acrylic resins, vinyl resins or the like. Exemplary solvents and thinners include, but are not limited to, glycol ethers, alcohols, aromatics, e.g. aromatic hydrocarbons, white spirit, branched ketones and esters. Exemplary additives include, but are not limited to, catalysts, lubricants, wetting agents, defoamers, flow agents, release agents, slip agents, anti-blocking agents, additives to mask sulfur staining, pigment wetting/dispersion agents, anti-settling agents, UV stabilizers, adhesion promoters. Pigments include, but are not limited to titanium dioxide, zinc oxide, aluminum oxide, zinc and aluminum. The substrate may also be pre-coated with one or more pre-coated laminate compositions. Such compositions may, for example, include polyethylene, polypropylene, or polyester compositions, and may be applied either as a film via film lamination process or melt-extrusion coating process onto the metal surface.

The one or more aqueous dispersions and/or coating composition derived therefrom applied to the at least one surface of the substrate may be dried via any conventional drying method. Such conventional drying methods include but, are not limited to, air drying, convection oven drying, hot air drying, and/or infrared oven drying. During the drying process, crosslinking of one or more base polymers, stabilizing agents, or combinations thereof, involving one or more the crosslinking agents, may occur. Additional cure might occur by radiation cure, e.g. electron-beam cure. The one or more aqueous dispersions and/or coating composition derived therefrom applied to the at least one surface of the substrate may be dried at any temperature; for example, it may be dried at a temperature in the range of equal or greater than the melting point temperature of the first polyester; or in the alternative, it may be dried at a temperature in the range of less than the melting point of the stabilizing agent comprising a second polyester. The one or more aqueous dispersions and/or coating composition derived therefrom applied to the at least one surface of the substrate may be dried at a temperature in the range of about 60° F. (15.5° C.) to about 700° F. (371° C.) for a period of less than about 40 minutes, for example, less than 20 minutes, or less than 10 minutes, or less than 5 minutes, or less than 2 minutes, or less than 1 minute, or less than 20 seconds. All individual values and subranges from about 60° F. (15.5° C.) to about 700° F. (371° C.) are included herein and disclosed herein; for example, the one or more aqueous dispersions and/or coating composition derived therefrom applied to the at least one surface of the substrate may be dried at a temperature in the range of about 60° F. (15.5° C.) to about 500° F. (260° C.) for a period of less than about 40 minutes, for example, less than 20 minutes, or less than 10 minutes, or less than 5 minutes, or less than 2 minutes, or less than 1 minute, or in the alternative, the one or more aqueous dispersions and/or coating composition derived therefrom applied to the at least one surface of the substrate may be dried at a temperature in the range of about 60° F. (15.5° C.) to about 450° F. (232.2° C.) for a period of less than about 40 minutes, for example, less than 20 minutes, or less than 10 minutes, or less than 5 minutes, or less than 2 minutes, or less than 1 minute. The temperature of the one or more aqueous dispersions and/or coating composition derived therefrom applied to the at least one surface of the substrate may be raised to a temperature in the range of equal or greater than the melting point temperature of the base polymer for a period of less than about 40 minutes. All individual values and subranges from less than about 40 minutes are included herein and disclosed herein; for example, the temperature of the one or more aqueous dispersions and/or coating composition derived therefrom applied to the at least one surface of the substrate may be raised to a temperature in the range of equal or greater than the melting point temperature of the first polyester for a period of less than about 20 minutes, or in the alternative, the temperature of the one or more aqueous dispersions applied and/or coating composition derived therefrom to the at least one surface of the substrate may be raised to a temperature in the range of equal or greater than the melting point temperature of the first polyester for a period of less than about 5 minutes, or in another alternative, the temperature of the one or more aqueous dispersions and/or coating composition derived therefrom applied to the at least one surface of the substrate may be raised to a temperature in the range of equal or greater than the melting point temperature of the first polyester for a period in the range of about 0.5 to 300 seconds. In another alternative, the temperature of the one or more aqueous dispersions and/or coating composition derived therefrom applied to the at least one surface of the substrate may be raised to a temperature in the range of less than the melting point temperature of the first polyester for a period of less than about 40 minutes. All individual values and subranges from less than about 40 minutes are included herein and disclosed herein; for example, the temperature of the one or more aqueous dispersions and/or coating composition derived therefrom applied to the at least one surface of the substrate may be raised to a temperature in the range of less than the melting point temperature of the first polyester for a period of less than about 20 minutes, or in the alternative, the temperature of the one or more aqueous dispersions and/or coating composition derived therefrom applied to the at least one surface of the substrate may be raised to a temperature in the range of less than the melting point temperature of the first polyester for a period of less than about 5 minutes, or in another alternative, the temperature of the one or more aqueous dispersions applied and/or coating composition derived therefrom to the at least one surface of the substrate may be raised to a temperature in the range of less than the melting point temperature of the first polyester for a period in the range of about 0.5 to 300 seconds.

The coated substrate may further be coated with one or more conventional coating compositions, or it may further be laminated to one or more other layers. Such conventional coating compositions are generally known to person of ordinary skill in the art, and they may include, but are not limited to, epoxy resin coating compositions, acrylate based coating compositions, and polyester based coating compositions. The lamination process is generally known, and exemplary lamination layers may include, but are not limited to, polyester laminates, polyolefin based laminates such as polypropylene laminates.

The one or more aqueous dispersions and/or coating composition derived therefrom applied to at least one surface of a substrate, for example a pre-coated substrate, as one or more crosslinked coating layers may have a cross cut adhesion, before retort, rating of at least 3B; for example, 4 B or 5B, measured according to ASTM-D 3359-08. The one or more aqueous dispersions and/or coating composition derived therefrom applied to at least one surface of a substrate as one or more crosslinked coating layers may have a wedge bend pass rating of at least 50 percent, for example, at least 70 percent, or in the alternative, at least 80 percent, or in the alternative, at least 90 percent, measured via a Gardner "COVERALL" Bend Tester IG 1125.

EXAMPLES

The following examples illustrate the present invention but are not intended to limit the scope of the invention. The examples of the instant invention demonstrate that the one or more aqueous dispersions applied to at least one surface of a metal substrate provide for improved coating layer flexibility as well as coating layer adhesion to the metal substrate.

Description of Formulation Components

Crylcoat 1510 is an aromatic polyester having a $T_g$ of approximately 58° C., a melt viscosity of 8500 Poise at 200 C, an acid number of 71 mg KOH/g and a hydroxyl number of <20 mg KOH/g, available from Cytec Industries.

Cadence GS4 is a PET type copolyester polyester having a $T_g$ of 80° C., and an intrinsic viscosity of approximately 0.59 Dl/g, available from Eastman Chemical. CYMEL 303 crosslinking agent is a commercial grade of hexamethoxymethylmelamine supplied in liquid form at >98% non-volatile, a clear viscous liquid with a viscosity of 2600-5000 centipoise, available from Cytec Industries.

NACURE 5925 is an amine neutralized DDBSA catalyst, which is a clear, light amber liquid supplied as 25% active and with a typical recommended use level of 0.5 to 2.0% as supplied on total resin solids, available from King Industries.

Eastman AQ 55s is a sulfonated polyester having a $T_g$ of approximately 55° C., a melt viscosity of 42000 Poise at 200 C, an acid number<2 mg KOH/g and a hydroxyl number<10 mg KOH/g, available from Eastman Chemical.

Preparation of Inventive Aqueous Dispersion Example A and B

Aqueous dispersions A and B were prepared according to the following procedures based on the formulation components listed in Table 1. The one or more polyethylene terephthalate resins, and stabilizing agent were fed into a 25 mm diameter twin screw extruder by means of separate controlled rate feeders. In the extruder the one or more polyethylene terephthalate resins and stabilizer were melted, mixed and forwarded. The extruder temperature profile was initially set to 150° C. prior to the addition of the initial water and neutralizing agent. After the addition of initial water and neutralizing agent the temperature was lowered to 120° C. across the barrel. In Example A DMEA, 2-dimethyl amino ethanol (100%) (CAS No. 108-01-0) was used as the neutralizing agent. Example B used no neutralizing agent. The extruder speed was approximately 450 rpm. Amine base and initial water were mixed together and fed to the extruder at the initial water introduction point in example A, and only water was fed into the extruder at the initial water introduction point in example B. The dilution water was fed via a second pump, and it was introduced into the dilution zone of the extruder. The initial water and dilution water streams were optionally pre-heated to the extruder temperature. At the extruder outlet, a back-pressure regulator was used to adjust to a suitable pressure inside the extruder barrel to prevent steam formation at the operating temperature. The resulting dispersions were cooled and filtered through a 200 micron filter. Inventive aqueous dispersion example A was tested for its properties, and the results are reported in Table 3.

TABLE 1

| Aqueous Dispersion | Polyethylene Terephthalate Resins (g/min) | Stabilizing Agent Comprising Second Polyester (g/min) | Neutralizing Agent (ml/min) | Initial Water Rate (ml/min) | Dilution Water Rate (ml/min) | Average Particle Size Diameter (microns) |
|---|---|---|---|---|---|---|
| Inventive Example A | Cadence GS4 (60.5) | Crylcoat 1510 (15.1) | DMEA (2.3) | 10.7 | 65 | 1.1 |
| Inventive Dispersion B | Cadence GS4 (64.3) | Eastman AQ 55 (11.3) | n/a (0) | 12.3 | 70 | 1.0 |

TABLE 2

| Aqueous Dispersion | Polyethylene Terephthalate Resins (W %) | Stabilizing Agent Comprising Second Polyester (W %)) | Neutralizing Agent (W %)) | Water (W %)) | Measured Total Solid (W %) | % Neutralization | pH | Average Particle Size Diameter (microns) |
|---|---|---|---|---|---|---|---|---|
| Inventive Example A | Cadence GS4 (39.38) | Crylcoat 1510 (9.84) | DMEA (1.48) | 49.30 | 49.27 | 120 | 9.09 | 1.1 |
| Inventive Example B | Cadence GS4 (40.72) | Eastman AQ 55 (7.16) | n/a 0% | 52.12 | 51.03 | n/a | 6.82 | 1.0 |

Comparative Coating Composition Examples 1 and 2

Dynapol L952 was dissolved into a 1:1 blend by weight of toluene and PM acetate (1-methoxy-2-acetoxypropane) at 70° C. to produce a 40% weight solids solution. This procedure was performed in 5 liter round bottom flask under constant agitation with a rod stirrer and a heating mantle, resulting in ~3500 g of solution. After cooling to room temperature (~25° C.), this solution was then mixed with Cymel™ 303LF, hexamethoxymethylmelamine resin (Cytec Industries), as a crosslinking agent, Nacure 5925, amine neutralized dodecylbenzene sulfonic acid (King Industries), as a catalyst, and PM acetate to reduce solids in a 2 oz. glass jar using a tumbler at room temperature, approximately 25° C., overnight (18-24 hrs) to yield the comparative coating composition example 1. Following the same procedure described above as in comparative coating composition example 1, Dynapol L952 solvent based solution was mixed with Cymel 303LF, Crylcoat 1510-0, DMEA, for amine neutralization, Nacure 5925, and PM acetate to form comparative coating composition example 2. Coatings formulation components for comparative coating composition examples 1 and 2 are listed in Table 3.

Coating Application

Inventive Aqueous dispersion example A was applied to an aluminum metal panel using a draw down bar and baked for 30 minutes at 120° C. to give a coating with an excellent balance of hardness and flexibility along with good chemical resistance and adhesion to metal, as shown in Table 4.

TABLE 4

| | |
|---|---|
| Film Thickness (mils)-Average 5 | 1.34 |
| 20 deg Gloss ave on Al panel | 99.4 |
| Pencil Hardness | HB |
| Konig Hardness [sec] | |
| 24 hrs after bake | 216 |
| X-Hatch Adhesion | 5B |
| MEK Resistance [double rubss] | |
| First cut through coating | 10 |
| Acid Etch Test | |
| 1$^{st}$ visible defect (4) ° C. | 50 |
| Severe defect (1) ° C. | 76 |
| Rating @ 60° C. | 5 |
| Rating @ 70° C. | 2 |

TABLE 3

| Coating Composition | Dynapol L952 SB Solution Amount (g) | Crylcoat 1510-0 Amount (g) | Cymel 303LF Amount (g) | DMEA Amount (g) | Nacure 5925 Amount (g) | Extra PMA Amount (g) | Total Formulation Amount (g) | Total Formulation % Solids |
|---|---|---|---|---|---|---|---|---|
| Comparative Example 1 | 25.00 | 0.00 | 4.29 | 0.00 | 0.07 | 18.50 | 47.86 | 30.00 |
| Comparative Example 2 | 25.00 | 2.50 | 4.29 | 0.28 | 0.09 | 25.74 | 57.90 | 29.64 |

TABLE 4-continued

Steel Panels/Impact Resistance

| | |
|---|---|
| Direct (in-lbs) | 130 |
| Indirect (in-lbs) | 130 |

Chemical Tests (24 hr covered)

| | |
|---|---|
| Water | 4 |
| Antifreeze | 5 |
| Power Steering Fluid | 5 |
| Windshield Wash Solvent | 5 |
| Used Motor Oil | 5 |
| Bleach 6% | 5 |
| Glass Cleaner | 3 |
| 5% NaOH | 5 |
| 5% Acetic Acid | 5 |

1-5 scale, where 5 is best

Inventive Coating Compositions 1-4

Inventive aqueous dispersion A was mixed with Cymel™ 303LF, hexamethoxymethylmelamine resin (Cytec), as a crosslinking agent, and Nacure 5925, amine neutralized dodecylbenzene sulfonic acid (King Industries), as a catalyst in a 2 oz. glass jar using a tumbler at room temperature, approximately 25° C., overnight (18-24 hrs) to yield Inventive Coating compositions 1-4. Coatings formulation components are listed in Table 5.

Inventive Coating Compositions 5-7

Inventive aqueous dispersion B was mixed with Cymel™ 303LF, hexamethoxymethylmelamine resin (Cytec Industries), as a crosslinking agent, and Nacure 5925, amine neutralized dodecylbenzene sulfonic acid (King Industries), as a catalyst in a 2 oz. glass jar using a tumbler at room temperature, approximately 25° C., overnight (18-24 hrs) to yield Inventive Coating compositions 5-7. Coatings formulation components are listed in Table 5.

TABLE 5

| Inventive Coating Composition | Dispersion | Dispersion Amount (g) | Cymel 303LF Amount (g) | Nacure 5925 Amount (g) | Total Formulation Amount (g) | Total Formulation % Solids |
|---|---|---|---|---|---|---|
| Inventive Example 1 | A | 40.00 | — | — | 40.00 | 49.27 |
| Inventive Example 2 | A | 40.00 | 1.04 | 0.10 | 41.14 | 50.68 |
| Inventive Example 3 | A | 40.00 | 2.19 | 0.11 | 42.30 | 52.03 |
| Inventive Example 4 | A | 40.00 | 8.45 | 0.14 | 48.59 | 58.24 |
| Inventive Example 5 | B | 40.00 | — | — | 40.00 | 51.03 |
| Inventive Example 6 | B | 40.00 | 1.07 | 0.11 | 41.18 | 52.44 |
| Inventive Example 7 | B | 40.00 | 2.27 | 0.11 | 42.38 | 53.78 |

Coating Application

A tin plate panel, provided by Rasselstein, having grade TS-245 standard finish, with approximately 10 cm to 20 cm size was cleaned with acetone, and then dried. About 3 grams of the inventive coating compositions 1-4 were applied individually to the tin plate panel via a 35 micron (1.4 mil #14) wirewound drawdown bar thereby coating one surface of the tin plate panel. Subsequently, the panel was placed into a convection oven to be cured for 10 minutes at 200° C. The coated tin plate panels were tested for wedge bend, cross cut adhesion before sterilization, and cross cut adhesion and blush after sterilization according to the procedures described below. Aluminum panels (can stock clean aluminum measuring 0.009×4"×12" from All Foils), cleaned with acetone and dried, were used for coating thickness and MEK DR (methyl ethyl ketone double rub) evaluation. The results are reported in Table 6-9.

TABLE 6

| Inventive Coating Composition | Coating Thickness (mil) | MEK Double Rubs | Wedge Bend (% Pass) | Crosscut Adhesion Before Retort in Water | Crosscut Adhesion After Retort in Water | Retort resistance in Water |
|---|---|---|---|---|---|---|
| Inventive Example 1 | 0.41-0.45 | 5 | 100 | 5B | 5B | 3 |

TABLE 7

| Inventive Coating Composition | Crosscut Adhesion Before Retort in Lactic Acid | Crosscut Adhesion After Retort in Lactic Acid | Retort resistance in Lactic Acid |
|---|---|---|---|
| Inventive Example 1 | 5B | 5B | 3 |

TABLE 8

| Coating Composition | Coating Thickness (mil) | MEK Double Rubs | Wedge Bend (% Pass) | Crosscut Adhesion Before Retort in Water | Crosscut Adhesion After Retort in Water | Retort Resistance in Water |
|---|---|---|---|---|---|---|
| Inventive Example 2 | 0.29-0.34 | 150+ | 100 | 5B | 5B | 3 |
| Inventive Example 3 | 0.25-0.37 | 150+ | 100 | 5B | 5B | 3 |

TABLE 8-continued

| Coating Composition | Coating Thickness (mil) | MEK Double Rubs | Wedge Bend (% Pass) | Crosscut Adhesion Before Retort in Water | Crosscut Adhesion After Retort in Water | Retort Resistance in Water |
|---|---|---|---|---|---|---|
| Inventive Example 4 | 0.37-0.43 | 150+ | 100 | 5B | 0B | 2 |
| Inventive Example 5 | 0.42-0.48 | 5 | 76 | — | — | — |
| Inventive Example 6 | 0.36-0.43 | 150+ | 100 | — | — | — |
| Inventive Example 7 | 0.42-0.45 | 150+ | 100 | — | — | — |
| Comparative Example 1 | 0.35-0.45 | 65 | 84 | 5B | 5B | 5 |
| Comparative Example 2 | 0.35-0.45 | 60 | 76 | 5B | 5B | 4 |

TABLE 9

| Coating Composition | Coating Formulation | Crosscut Adhesion Before Retort in Lactic Acid | Crosscut Adhesion After Retort in Lactic Acid | Retort Resistance in Lactic Acid |
|---|---|---|---|---|
| Inventive Example 2 | 2 | 5B | 3B | 3 |
| Inventive Example 3 | 3 | 5B | 0B | 3 |
| Inventive Example 4 | 4 | 5B | 0B | 3 |
| Comparative Example 1 | 5 | 5B | 0B | 4 |
| Comparative Example 2 | 6 | 5B | 2B | 4 |

Test Methods

Test methods include the following:
Particle Size Measurement

The average particle size was measured by a Coulter LS-230 particle size analyzer (Beckman Coulter Corporation).

Film thickness of the coatings was determined by following ASTM D 1186.

Impact resistance was measured according to ASTM D5420 using a Gardner impact tester (Paul N. Gardner Co).

Konig hardness of the coating films were determined according to ASTM-D 4366 (1995) by using a pendulum hardness tester and is reported in seconds.

The pencil hardness of the coating films was measured by following ASTM D 3363 (2005) using pencils with leads ranging in hardness from 6B to 4H (Paul N. Gardner Co).

The solvent resistance of the coating films was measured according to ASTM D4752 using methyl ethyl ketone (MEK) as the solvent with the number of rubs reported before a blister in or breakthrough of the film occurs. The rubs are counted as a double rubs, i.e. one rub forward and one rub backward constitutes a double rub. This test method is used to determine the curing degree of coating film and its resistance to a specific solvent.

Gloss was measured according to ASTM D523 using a BYK Micro-Tri-Gloss meter.

The acid etch resistance of the coating was determined by using a BYK Chemie gradient temperature oven and was reported as the lowest temperature (in ° C.) that a 10% solution of $H_2SO_4$ would either mar the film (1st visible defect) or cut through to the substrate (severe defect) if left on the coating for 15 minutes. The higher the temperature reported, the more resistant the coating was to acid.

The film appearance was also rated at 60 and 70° C. (1-5 scale, where 5 is best).

The resistance to a variety of chemicals was measured by placing a 1 ml drop of the chemical on the coating and allowing it to stand for 24 hours (covered to prevent evaporation) after which time the appearance of the film was rated (1-5 scale, where 5 is best).

Cross-Cut Adhesion before Retort

Cross-cut adhesion is measured according to ASTM-D 3359-02, measuring adhesion by tape test, Method B., using an Erichsen cross-cut tester EPT 675R. This method provides the procedure for assessing the adhesion of coating films to metallic substrates by applying and removing a tape (grade: TESA 4124 clear) over the cuts made in the film. Place the centre of a piece of tape over the grid and in the area of the grid smooth into place by a finger. To ensure good contact with the film rub the tape firmly. Within 90±30 seconds of application, remove the tape by seizing the free end and rapidly (not jerked) pulling it off at as close to an angle of 180 degrees as possible. Inspect the grid area for removal of coating from the substrate or from a previous coating using the illuminated magnifier. Rate the adhesion in accordance with the following scale rating:

| | |
|---|---|
| 5B | The edges of the cuts are completely smooth; none of the squares of the lattice is detached. |
| 4B | Small flakes of the coating are detached at intersections; less than 5% of the area is affected. |
| 3B | Small flakes of the coating are detached along the edges and at intersections of cuts. The area affected is 5-15% of the lattice. |
| 2B | The coating has flaked along the edges and on parts of the squares. The area affected is 15-35% of the lattice. |
| 1B | The coating has flaked along the edges of cuts in large ribbons and whole squares have detached. The area affected is 35-65% of the lattice. |
| 0B | Flaking and detachment is worse than 1B |

Cross-Cut Adhesion after Retort

In addition to testing cross cut adhesion on the dry panels prior to water retort exposure, a cross-cut adhesion test is performed within an hour of being removed from the autoclave and rated for adhesion as described in the cross cut adhesion section. The adhesion is rated in accordance with the following scale rating:

| | |
|---|---|
| 5B | The edges of the cuts are completely smooth; none of the squares of the lattice is detached. |
| 4B | Small flakes of the coating are detached at intersections; less than 5% of the area is affected. |
| 3B | Small flakes of the coating are detached along the edges and at intersections of cuts. The area affected is 5-15% of the lattice. |
| 2B | The coating has flaked along the edges and on parts of the squares. The area affected is 15-35% of the lattice. |
| 1B | The coating has flaked along the edges of cuts in large ribbons and whole squares have detached. The area affected is 35-65% of the lattice. |
| 0B | Flaking and detachment is worse than 1B |

Retort Resistance (Water)

The coated panels were immersed in water in individual pressurizable glass beakers that were contained in a secondary container tray, and placed into a Tuttnauer 10" dia×18" Deep Chamber Autoclave model 1 Z-TUT-EZ-10 where they were retorted at 129° C. for 30 minutes. The panels were removed, and dried. The coating appearance was then rated on a scale of 1-5 (5—best, 1-worst) as determined by blush (a whitish appearance of the coating). as shown below.

| | |
|---|---|
| 5 | No Blush |
| 4 | Very Slight blush |
| 3 | Slight blush |
| 2 | Blush |
| 1 | Strong Blush |

Retort Resistance (Lactic Acid)

The coated panels were immersed in 2% lactic acid in individual pressurizable glass beakers that were contained in a secondary container tray, and placed into a Tuttnauer 10" dia×18" Deep Chamber Autoclave model 1 Z-TUT-EZ-10 where they were retorted at 121° C. for 30 minutes. The panels were removed, and dried. The coating appearance was then rated on a scale of 1-5 (5—best, 1—worst) as determined by blush (a whitish appearance of the coating) as shown below.

| | |
|---|---|
| 5 | No Blush |
| 4 | Very Slight blush |
| 3 | Slight blush |
| 2 | Blush |
| 1 | Strong Blush |

MEK Double Rub

The round end of a 1.5 pound ball peen hammer was used to perform the MEK double rub test by applying a force of ~1000-2000 g to the coating. A 4"×4" square of cheesecloth was bound around the hammer end and soaked with methyl ethyl ketone (MEK). The hammer was brought into contact with the coating, and moved forth-and-back over a section measuring approximately 6"×1", wherein one movement forth-and-back over the whole coating is considered one double rub. Double rubs were performed at a rate of about one double rub per second. No additional pressure was applied onto the hammer. After every 25 double rubs, the tissue was re-soaked. The double rub step was repeated until the coating was rubbed off, i.e. at least a portion of the metal substrate was exposed (excluding the ½" end sections of the testing area). In the event that the double rub step reached 150 double rubs, the testing was terminated, and 150+ double rubs were reported as the final results.

Wedge Bend

Wedge bend was measured via Gardner "COVERALL" Bend Tester IG 1125. The apparatus used for this test consists of two parts to convert it to a bending machine. A steel rod (mandrel) is mounted at the front of the base. The coated test panel of 100 mm width was flexed over the 3 mm rod mandrel; thus, the coating appears on the outside of the bend. The flexed panel was inserted in the wedge mandrel. The impacter, i.e. a metal weight, was raised to 40 centimeters height, and then dropped. The impacter is retrieved on its first bounce, and secured. The cylindrical fold in the panel was squeezed into a conical shape. The edge of the coated panel was rubbed with a solution of copper sulfate (mixture of 10 grams of copper sulfate, 90 grams of water and 3 grams of sulfuric acid). Anywhere the coating had been cracked; dark spots appeared, indicating failure. The length of the intact area along the length of the wedge bend, which is 100 mm, was measured in millimeters and expressed as percent ok.

Coating Thickness

Coating thickness was measured according to ASTM-D 1186-93, non-destructive measurement of dry film thickness of non magnetic coatings applied to a non-ferrous base, using a Byko-Test 8500 coating thickness gauge. The standard aluminum panel without any coating was used for calibration. The thickness of the coating of the coated panels was reported as the range of 10 measurements, wherein each measurement of the thickness of the coating of the coated panels was measured using a probe for non-ferrous materials relative to the thickness of the coating of the standard panel, i.e. zero. The measured thickness was reported in mils.

The present invention may be embodied in other forms without departing from the spirit and the essential attributes thereof, and, accordingly, reference should be made to the appended claims, rather than to the foregoing specification, as indicating the scope of the invention.

We claim:

1. An aqueous dispersion comprising the melt blending product of:
    (a) from 50 to 99 percent by weight of one or more polyethylene terephthalate resins, based on the total solid content of the dispersion;
    (b) from 1 to 50 percent by weight of one or more stabilizing agents comprising at least one second polyester, based on the total solid content of the dispersion, wherein said second polyester (i) has a carboxylic acid group and an acid number equal to or greater than 15, based on the solid content of the second polyester; or (ii) is a self-dispersing sulfopolyester;
    (c) optionally one or more neutralizing agents; and
    (d) from 15 to 90 percent by weight of water, based on the total weight of the dispersion;
    wherein said dispersion has a solid content of 10 to 85 percent, based on the total weight of the dispersion, and wherein the volume average particle size of the dispersion is less than 5 microns.

2. A method for producing a aqueous dispersion comprising the steps of:
    selecting one or more polyethylene terephthalate resins;
    selecting one or more stabilizing agents comprising at least one second polyester, wherein said second polyester (i) has a carboxylic acid group and an acid number equal to or greater than 15, based on the solid content of the second polyester; or (ii) is a self-dispersing sulfopolyester;
    optionally selecting one or more neutralizing agents;

melt-blending said one or more polyethylene terephthalate resins, one or more stabilizing agents in the presence of water and optionally one or more neutralizing agents;

thereby producing an aqueous dispersion having a solid content of 10 to 85 percent, based on the total weight of the dispersion, and wherein the volume average particle size of the dispersion is less than 5 microns.

3. A coating composition comprising:
the aqueous dispersion of claim 1;
optionally one or more cross-linking agents;
optionally one or more cross-linking catalysts;
optionally one or more solvents;
optionally one or more selected from the group consisting of a polyolefin dispersion, acrylic latex, alkyd dispersion, epoxy resin dispersion, polyurethane dispersion, vinyl acetate dispersion, and ethylene vinyl acetate dispersion; and
optionally one or more additives.

4. An aqueous dispersion comprising the melt blending product of: (a) from 50 to 99 percent by weight of one or more polyethylene terephthalate resins, based on the total solid content of the dispersion; wherein the polyethylene terephalate resin has a glass transition temperature ($T_g$) of at least 65° C., and an intrinsic viscosity of 0.5-1.0 Dl/g;

(b) from 1 to 50 percent by weight of one or more stabilizing agents comprising at least one second polyester, based on the total solid content of the dispersion, wherein said second polyester has a carboxylic acid group and an acid number equal to or greater than 20, based on the solid content of the second polyester;

(c) one or more neutralizing agents; and (d) from 15 to 90 percent by weight of water, based on the total weight of the dispersion;

wherein said dispersion has a solid content of 10 to 85 percent, based on the total weight of the dispersion, and wherein the volume average particle size of the dispersion is less than 5 microns.

5. A coating layer comprising one or more film layers derived from the dispersion of claim 1 or the coating composition of claim 3.

6. A coated article comprising:
one or more substrates;
at least one or more coating layers derived from the dispersion of claim 1 or the coating composition of claim 3.

7. A method for making a coated article comprising the steps of:
selecting a substrate;
selecting the coating composition of claim 3;
applying said coating composition to at least one surface of said substrate;
removing at least a portion of the water from said the coating composition;
thereby forming one or more coating layers associated with said substrate; and
forming said coated substrate into a coated article.

8. A method for making a coated article comprising the steps of:
selecting a substrate;
forming said substrate into article;
selecting the coating composition of claim 3
applying said the coating composition to at least one surface of said article;
removing at least a portion of the water from said the coating composition;
thereby forming one or more coating layers associated with at least one surface of said article; and
thereby forming said coated article.

9. The aqueous dispersion of claim 1, wherein said one or more polyethylene terephthalate resins have a glass transition temperature ($T_g$) of at least 30° C.

10. The coated article of claim 6, wherein said substrate is a pre-coated substrate.

11. A can or coil coating composition comprising the coating composition of claim 3.

12. A can or coil coating composition comprising
the aqueous dispersion of claim 4;
optionally one or more cross-linking agents;
optionally one or more cross-linking catalysts;
optionally one or more solvents;
optionally one or more selected from the group consisting of a polyolefin dispersion, acrylic latex, alkyd dispersion, epoxy resin dispersion, polyurethane dispersion, vinyl acetate dispersion, and ethylene vinyl acetate dispersion; and
optionally one or more additives.

* * * * *